(12) United States Patent
Chen et al.

(10) Patent No.: US 9,451,252 B2
(45) Date of Patent: Sep. 20, 2016

(54) CODING PARAMETER SETS AND NAL UNIT HEADERS FOR VIDEO CODING

(71) Applicant: Qualcomm Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 800 days.

(21) Appl. No.: 13/738,377

(22) Filed: Jan. 10, 2013

(65) Prior Publication Data

US 2013/0182755 A1   Jul. 18, 2013

Related U.S. Application Data

(60) Provisional application No. 61/586,777, filed on Jan. 14, 2012, provisional application No. 61/587,070, filed on Jan. 16, 2012, provisional application No. 61/588,629, filed on Jan. 19, 2012, provisional application No. 61/637,195, filed on Apr. 23, 2012, provisional application No. 61/637,774, filed on Apr. 24, 2012.

(51) Int. Cl.
*H04N 7/26* (2006.01)
*H04N 19/463* (2014.01)
(Continued)

(52) U.S. Cl.
CPC ........ *H04N 19/00551* (2013.01); *H04N 19/30* (2014.11); *H04N 19/46* (2014.11); *H04N 19/70* (2014.11)

(58) Field of Classification Search
CPC ................................................. H04N 19/00551
USPC ....................................................... 375/240.01
See application file for complete search history.

(56) References Cited

U.S. PATENT DOCUMENTS 7,302,490 B1   11/2007   Gupta et al.
7,724,818 B2   5/2010   Hannuksela et al.
(Continued)

FOREIGN PATENT DOCUMENTS

EP         1385337 A1    1/2004
WO      2004010700 A1    1/2004
(Continued)

OTHER PUBLICATIONS

Chen, et al., "AHG10: Video parameter set for HEVC base specification", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16 ); URL: URL:http://wftp3.itu.int/AV-ARCH/JCTVC-SITE/, No. JCTVC-J0114, XP030112476, 15 pp.
(Continued)

*Primary Examiner* — Yulin Sun
(74) *Attorney, Agent, or Firm* — Shumaker & Sieffert, P.A.

(57) ABSTRACT

In one example, a video coder, such as a video encoder or video decoder, is configured to code a video parameter set (VPS) for one or more layers of video data, wherein each of the one or more layers of video data refer to the VPS, and code the one or more layers of video data based at least in part on the VPS. The video coder may code the VPS for video data conforming to High-Efficiency Video Coding, Multiview Video Coding, Scalable Video Coding, or other video coding standards or extensions of video coding standards. The VPS may include data specifying parameters for corresponding sequences of video data within various different layers (e.g., views, quality layers, or the like). The parameters of the VPS may provide indications of how the corresponding video data is coded.

45 Claims, 12 Drawing Sheets

(51) Int. Cl.
　　　*H04N 19/70* (2014.01)
　　　*H04N 19/46* (2014.01)
　　　*H04N 19/30* (2014.01)

(56) References Cited

U.S. PATENT DOCUMENTS

| | | | |
|---|---|---|---|
| 7,742,524 | B2 | 6/2010 | Jeon et al. |
| 7,848,407 | B2 | 12/2010 | Yoon |
| 8,145,498 | B2 | 3/2012 | Herre et al. |
| 8,891,619 | B2 | 11/2014 | Leontaris et al. |
| 2004/0006575 | A1 | 1/2004 | Visharam et al. |
| 2005/0254575 | A1 | 11/2005 | Hannuksela et al. |
| 2005/0276323 | A1 | 12/2005 | Martemyanov et al. |
| 2006/0050793 | A1 | 3/2006 | Wang et al. |
| 2006/0233247 | A1 | 10/2006 | Visharam et al. |
| 2006/0294171 | A1 | 12/2006 | Bossen et al. |
| 2007/0086521 | A1 | 4/2007 | Wang |
| 2008/0253671 | A1 | 10/2008 | Choi et al. |
| 2009/0003431 | A1 | 1/2009 | Zhu et al. |
| 2010/0027654 | A1 | 2/2010 | Jeon et al. |
| 2010/0091881 | A1 | 4/2010 | Pandit et al. |
| 2010/0131980 | A1 | 5/2010 | Rodriguez |
| 2010/0132007 | A1 | 5/2010 | Rodriguez |
| 2010/0189182 | A1 | 7/2010 | Hannuksela |
| 2010/0195738 | A1 | 8/2010 | Zhu et al. |
| 2010/0208796 | A1* | 8/2010 | Luo ............... H04N 19/597 375/240.02 |
| 2010/0266042 | A1 | 10/2010 | Koo et al. |
| 2011/0128923 | A1 | 6/2011 | Cilli et al. |
| 2011/0274158 | A1 | 11/2011 | Fu et al. |
| 2012/0057635 | A1 | 3/2012 | Rusert et al. |
| 2012/0092452 | A1 | 4/2012 | Tourapis |
| 2012/0183060 | A1 | 7/2012 | Hong |
| 2012/0183076 | A1 | 7/2012 | Boyce |
| 2012/0230429 | A1 | 9/2012 | Boyce |
| 2012/0230430 | A1 | 9/2012 | Wenger |
| 2012/0230431 | A1 | 9/2012 | Boyce |
| 2013/0034170 | A1 | 2/2013 | Chen et al. |
| 2013/0094774 | A1* | 4/2013 | Misra ............... H04N 19/70 382/233 |
| 2013/0114670 | A1 | 5/2013 | Chen et al. |
| 2013/0114694 | A1 | 5/2013 | Chen et al. |
| 2013/0182755 | A1 | 7/2013 | Chen et al. |
| 2013/0195201 | A1 | 8/2013 | Boyce |
| 2014/0003491 | A1 | 1/2014 | Chen et al. |
| 2014/0003492 | A1 | 1/2014 | Chen et al. |
| 2014/0003493 | A1 | 1/2014 | Chen et al. |
| 2014/0218473 | A1 | 8/2014 | Hannuksela |
| 2014/0301441 | A1 | 10/2014 | Wang et al. |
| 2014/0301469 | A1 | 10/2014 | Wang et al. |
| 2014/0301483 | A1 | 10/2014 | Wang et al. |
| 2014/0301484 | A1 | 10/2014 | Wang et al. |
| 2014/0307803 | A1 | 10/2014 | Wang et al. |
| 2015/0117526 | A1 | 4/2015 | Choi |

FOREIGN PATENT DOCUMENTS

| | | |
|---|---|---|
| WO | 2007114608 A1 | 10/2007 |
| WO | 2007126508 A2 | 11/2007 |
| WO | 2008085013 A1 | 7/2008 |
| WO | 2008088497 A2 | 7/2008 |
| WO | 2010086501 A1 | 8/2010 |
| WO | 2010126612 A1 | 11/2010 |

OTHER PUBLICATIONS

Chen, et al., "AHG10: On video parameter set for HEVC extensions," JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0124, XP030112486, 15 pp.
Wang, et al., "AHG9: VPS and SPS designs in HEVC 3DV and scalable extensions", JCT-VC Meeting; Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0268, XP030114225, 22 pp.
Deshpande, "On Video Signal Information in VPS", JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL:http://phenix.int-evry.fr/jct2/, No. JCT3V-F0063, XP030131470, 6 pp.
Hannuksela, et al., "Scalable multi-view video coding", JVT Meeting; Apr. 6, 2008-Apr. 10, 2008; Geneva; ;(Joint Video team OFISO/IEC JTC1/SC29/WG11 and ITU-T SG.16); No. JVT-AA044, XP030007387, 6 pp.
Vetro, et al.,"Joint Draft 6.0 on Multiview Video Coding", JVT Meeting; MPEG Meeting; Jan. 13, 2008-Jan. 18, 2008; Antalya, ;(Joint Video Team of ISOIIEC JTCIISC29NVG11 and ITU-T SG.16), No. JVT-Z209, XP030007344, 41 pp.
Suh et al.,"Shortened NAL unit header for light apps", JVT Meeting; MPEG Meeting; Jan. 13, 2007-Jan. 20, 2007; Marrakech,MA; (Joint Video Team of ISO/IEC JTC1/SC29/WG11 and ITU-T SG.16), No. JVT-V129, XP030006937, 6 pp.
International Search Report and Written Opinion from International Application No. PCT/ US2013/021227, dated May 23, 2014, 21 pp.
Second Written Opinion from International Application No. PCT/US2013/021227, dated Oct. 22, 2014, 8 pp.
International Preliminary Report on Patentability from International Application No. PCT/US2013/021227, dated Jan. 23, 2015, 10 pp.
Boyce et al., "High level syntax hooks for future extensions", Joint Collaborative Team on Video Coding, JCTVC-H0388, Feb. 1-10, 2012, 8 pp.
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "High efficiency video coding (HEVC) text specification draft 9," Joint Collaborative Team on Video Coding, JCTVC-K1003_v7, Oct. 10-19, 2012, 290 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
Singer "Towards storing JVT in an MP4 File", International Organisation for Standardisation, MPEG4/M8438, Apr. 2002, 10 pp.
Hannuksela, "Coding of Parameter Sets", Joint Video Team of ISO/IEC MPEG & ITU-T VCEG), JVT-C078, May 6-10, 2002, 14 pp.
International Telecommunication Union, "Advanced video coding for generic audiovisual services," Standardization Sector of ITU, Jun. 2011, 674 pp.
Li et al., "Comments on Slice Common Information Sharing", Joint Collaborative Team on Video Coding, JCTVC-F187, Jun. 14-22, 2011, 3 pp.
U.S. Appl. No. 13/669,595, by Ying Chen, filed Nov. 6, 2012.
Wenger et al., "Adaptation Parameter Set (APS)," Joint Collaborative Team on Video Coding, JCTVC-F747r3, Jul. 14-22, 2011, 10 pp.
Wenger et al., "High level syntax for loop filter parameters," Joint Collaborative Team on Video Coding, JCTVC-F747 PowerPoint, Jul. 14-22, 2011, 7 slides.
Wenger et al.,"Adaptation Parameter Set (APS)", Joint Collaborative Team on Video Coding, JCTVC-F747, Jul. 14-22, 2011, 8 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011,193 pp.

(56) References Cited

OTHER PUBLICATIONS

Wiegand et al.,"WD1: Working Draft 1 of High-Efficiency Video Coding", Joint Collaborative Team on Video Coding, JCTVC-C403, Oct. 7-15, 2010, 137 pp.

Rusert, et al., "High level syntax for scalability support in HEVC," Joint Collaborative Team on Video Coding (JCT-VC) of ITU-T SG13 WP3 and ISO/IEC JTC1/SC29/WG11, Document No. JCTVC-F491, Jul. 21, 2011, 9 pp.

Chen, et al.,"AHG 17: Unified NAL unit header design for HEVC and its extensions", JCT-VC Meeting; MPEG Meeting; Nov. 21-30, 2011; Geneva; (Joint Collaborative Team on Video Coding of ISO/IEC JTC1/SC29/WG11 and ITU-TSG. 16 ); URL: http://Wftp3.itu.int/av-arch/jctvc-site/,, No. JCTVC-G336, XP030110320, 7 pp.

Boyce, et al., "Extensible High Layer Syntax for Scalability", MPEG Meeting; Mar. 21, 2011-Mar. 25, 2011; Geneva; (Motion Picture Expert Group or ISO/IEC JTC1/SC29/WG11), No. m19806, XP030048373, 10 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Partial International Search Report—PCT/US2013/021227—ISA/EPO—Mar. 27, 2014.

Sjoberg "On num reorder frames and max-dec frame buffering", JCT-VC Meeting; MPEG Meeting; Mar. 16, 2011-Mar. 23, 2011; Geneva;(Joint Collaborative Team on Video Coding of ISO/IEC JTC1/SC29/WG11and ITU-T SG.16 ); URL: http://wftp.itu.int/av-arch/jctvc-site/, No. JCTVC-E339, XP030008845, 4 pp.

Pandit, et al., "H.264/AVC extension for MVC using SEI message", Joint Video Team (JVT) of ISO/IEC MPEG & ITU-T VCEG (ISO/IEC JTC1/SC29/WG11 and ITU-T SG16 Q6), No. JVT-X061, Jun. 29, 2007, XP002506970, 14 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Boyce, et al., "NAL unit header and parameter Set designs for HEVC extensions", JCT-VC Meeting; MPEG Meeting; Oct. 10-19, 2012, Shanghai; (Joint Collaborative Team on Video Coding of ISO/IEC JTC1/SC29/WG11 and ITU-T SG.16); URL: http:I/wftp3.1tu.int/av-arch/jctvc-site/, No. JCTVC-K1007, 8 pp.

Flynn et al., "High Efficiency Video Coding (HEVC) Range Extensions text specification: Draft 4," Joint Collaborative team on Video coding (JCT-VC) of ITU-T SG16WP3 and ISO/IEC JTC1/SC29/WG11, 13th Meeting: Incheon, KR, Apr. 18-26, 2013, Document: JCTVC-N1005_V1, 332 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Rusert, "On VPS extension design", JCT-VC Meeting; MPEG Meeting; Jan. 14-23, 2013; Geneva; (Join'Collaborative Team on Video Coding of ISO/IEC JTC1/SC29/WG11 and ITU-T SG.16 ); URL: http:!/wftp.1tu.int/av-arch/jctvc-site/, No. JCTVC-L0138, XP030113626, 7 pp.

Skupin et al., "3D-HLS: Design of the Video Parameter Set for 3D-HEVC", JCT-3V Meeting; MPEG Meeting; Jul.16, 2012-Jul. 20, 2012; Stockholm; (The Joint Collaborative Team on 3D Video Coding Extension Development of ISO/IEC JTC1/SC29/WG11 and ITU-T SG.16); URL: http:I/phenix.int-evry.frijct2/, No. JCT3V-A0121, XP030130120, 10 pp.

Skupin, et al., "AHG9/AHG10: Design of the Video Parameter Set", JCT-VC Meeting; MPEG Meeting; Jul. 11-Jul. 20, 2012; Stockholm; (Joint Collaborative Team on Video Cooing of ISO/IEC JTC1/SC29/WG11 and ITU-T SG.16); URL: http:I/wftp3.1tujnt/av-arch/jctvc-site/, No. JCTVC-J0257, XP030112619, 9 pp.

Tech, et al., "MV-HEVC Draft Text 3", JCT-3V Meeting; MPEG Meeting, Jan. 17-23, 2013, Geneva, (The Joint Collaborative Team on 3D Video Coding Extension Development of ISO/IEC JTC1/SC29/WG11 and ITU-T SG.16 ), URL: http:I/phenix.int-evry.fr/jct2/, No. JCT3V-C1804, XP030130663, 27 pp.

Ikai, et al., "AHG7: on VPS extension", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http:I/phenix.int-evry.frijct, No. JCT3V-00086, XP030130502, 6 pp.

Chen, et al., "SHVC Working Draft 1", JCT-VC Meeting; MPEG Meeting; Jan. 14-23, 2013; Geneva; (Joint Collaborative Team on Video Coding of ISO/IEC JTC1/SC29/WG11 and ITU-T SG.16); URL: http:!/ wftp3.1tu.int/av-arch/jctvc-site/, No. JCTVC-L 1008_v34, updated Mar. 20, 2013, XP030113953, 33 pp.

Chen, et al., "AHG7: Target output view for MV-HEVC", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http:I/phenix.int-evry.frijct2/, No. JCT3V-C0059, XP030130475, 2 pp.

International Preliminary Report on Patentability from International Application No. PCT/US2013/021227, dated Jan. 23, 2016, 10 pp.

\* cited by examiner

CODING PARAMETER SETS AND NAL UNIT HEADERS FOR VIDEO CODING

This application claims the benefit of:

U.S. Provisional Application Ser. No. 61/586,777, filed Jan. 14, 2012;

U.S. Provisional Application Ser. No. 61/587,070, filed Jan. 16, 2012;

U.S. Provisional Application Ser. No. 61/588,629, filed Jan. 19, 2012;

U.S. Provisional Application Ser. No. 61/637,195, filed Apr. 23, 2012; and

U.S. Provisional Application Ser. No. 61/637,774, filed Apr. 24, 2012, each of which is incorporated herein by reference in its respective entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. A recent draft of the upcoming HEVC standard is available at http://phenix.int-evey.fr/jct/doc_end_user/documents/7_Geneva/wg11/JCTVC-G1103-v3.zip. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding parameter sets and network abstraction layer (NAL) units for video coding. These techniques may be applied to single-layer coded data, such as two-dimensional video data, as well as to scalable video coding (SVC) video data and multiview video coding (MVC) video data. Thus, the parameter sets and NAL units may be mutually compatible between various types of video data. For example, a video coder, such as a video encoder or video decoder, may code a video parameter set (VPS) that defines parameters for one or more layers of video data. The layers may correspond to, for example, SVC layers (having various frame rates, spatial resolutions, and/or quality levels) and/or views of MVC data (e.g., sequences of images of a scene captured from various camera perspectives about a horizontal axis).

In one example, a method of coding video data includes coding a video parameter set (VPS) for one or more layers of video data, wherein each of the one or more layers of video data refer to the VPS, and coding the one or more layers of video data based at least in part on the VPS.

In another example, a device for coding video data includes a video coder, such as a video encoder or video decoder, that is configured to code a video parameter set (VPS) for one or more layers of video data, wherein each of the one or more layers of video data refer to the VPS, and code the one or more layers of video data based at least in part on the VPS.

In another example, a device for coding video data includes means for coding a video parameter set (VPS) for one or more layers of video data, wherein each of the one or more layers of video data refer to the VPS, and means for coding the one or more layers of video data based at least in part on the VPS.

In another example, a computer-readable storage medium has stored thereon instructions that, when executed, cause a processor to code a video parameter set (VPS) for one or more layers of video data, wherein each of the one or more layers of video data refer to the VPS, and code the one or more layers of video data based at least in part on the VPS.

The details of one or more examples are set forth in the accompanying drawings and the description below. Other features, objects, and advantages will be apparent from the description and drawings, and from the claims.

DETAILED DESCRIPTION

Figure 1:
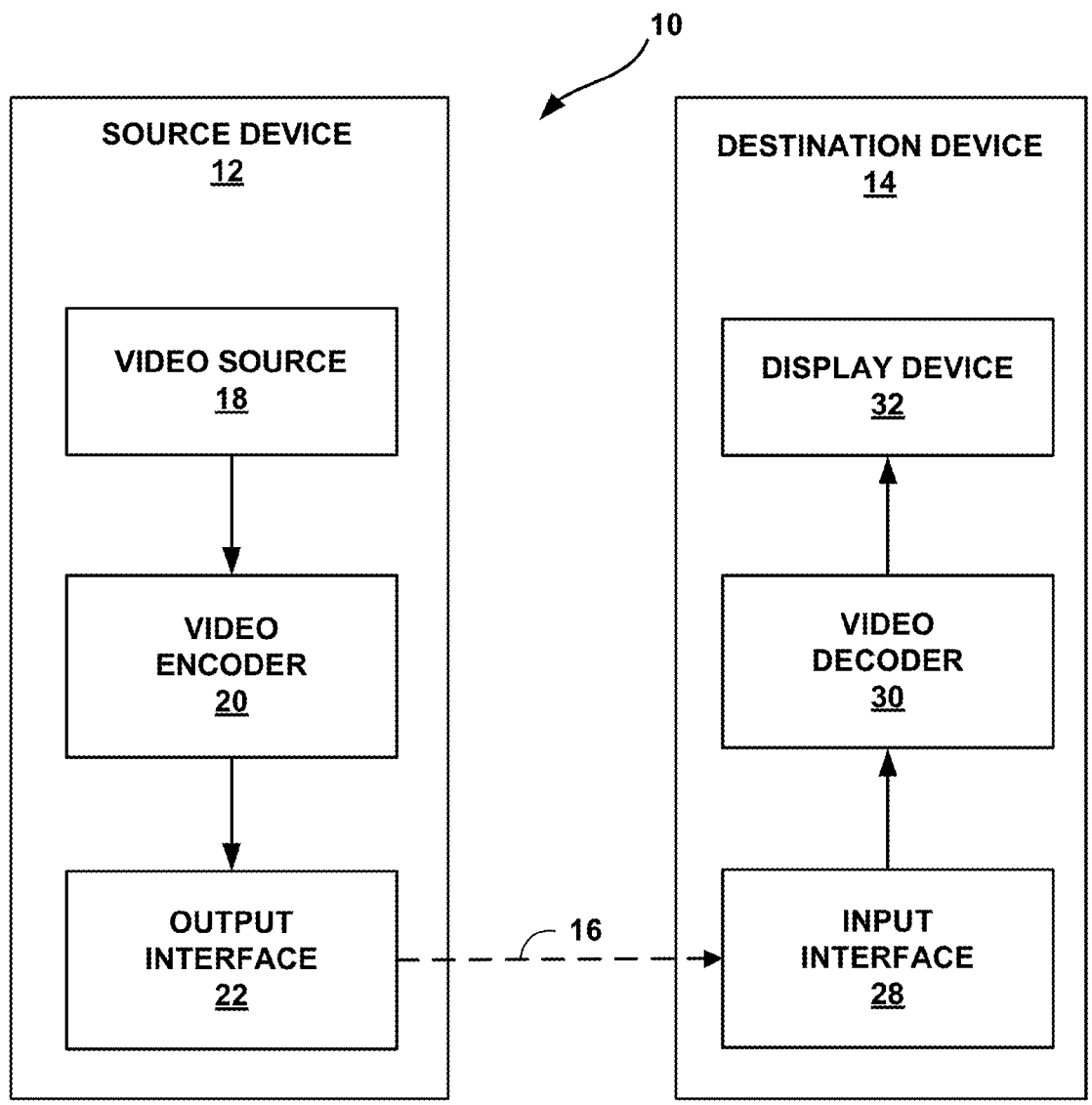
FIG. 1 is a block diagram illustrating an example video encoding and decoding system that may utilize techniques for coding parameter sets and network abstraction layer (NAL) units for one or more layers of video data

In general, this disclosure describes coding video data using a video parameter set (VPS). Video data may be hierarchically categorized as including a plurality of layers, a sequence of pictures within a given layer, a picture within a sequence, slices within a picture, and blocks (e.g., macroblocks or coding tree units) within a slice. Sequence parameter sets (SPSs) may be used to signal infrequently changing parameters for a sequence of pictures, and picture parameter sets (PPSs) may be used to signal infrequently changing parameters for individual pictures.

In accordance with the techniques of this disclosure, a VPS may signal infrequently changing parameters for a plurality of sequences across respective layers. That is, a VPS may include parameters for a set of temporally co-located sequences of different layers. Different layers may include, for example, different views for multi-view video data, different quality layers, different spatial resolution layers, temporally scalable layers (that is, layers allowing for different frame rates), and the like. In this manner, one VPS may be provided for a plurality of different layers, such that the VPS signals parameters that are common to each of the respective layers (e.g., respective sequences within the respective layers). A bitstream may be said to include each of the plurality of layers, and the respective layers may form respective sub-bitstreams. Moreover, a sub-bitstream may correspond to a combination of two or more layers.

This disclosure describes various examples of data which may be included in a VPS. Such data may include, in some examples, an indication of a number of sub-layers (e.g., a maximum number of sub-layers) within the corresponding layers. For example, a VPS may include data that signals a number of temporal layers and/or a maximum number of temporal layers (e.g., a highest temporal layer identifier).

As another example, a VPS may include, additionally or alternatively, data substantially similar to any data previously signaled in an SPS (that is, signaled in conventional SPSs). In this manner, when sequences of two or more layers of a bitstream include substantially similar or identical parameters, a video coder may code a VPS to signal parameters for the sequences of the layers, rather than redundantly coding such data in respective SPSs for the various sequences among the different layers.

A VPS may, additionally or alternatively, include data defining video usability information (VUI), such as video representation information, hypothetical reference decoder (HRD) parameters, and/or bitstream restriction information. Bitstream restriction information may include restrictions on motion vector range, decoded picture buffer (DPB) size (e.g., in terms of a number of pictures to be held by the DPB), number of reordering frames (that is, an indication of a number of frames to be reordered from decoding order to display order), coded sizes of blocks (e.g., macroblocks (MBs) or coding tree units), and coded sizes of pictures. A VPS may further provide data for one or more VPS extensions, such that the VPS can be extended by future standards or extensions to the upcoming HEVC standard.

FIG. 1 is a block diagram illustrating an example video encoding and decoding system 10 that may utilize techniques for coding parameter sets and network abstraction layer (NAL) units for one or more layers of video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding parameter sets and NAL units for one or more layers of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding parameter sets and NAL units for one or more layers of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, a video coder, such as video encoder 20 or video decoder 30, may be configured to code a video parameter set (VPS) for one or more layers of video data, and to code the one or more layers of video data based at least in part on the VPS. Tables 2 and 5, described in greater detail below, include example sets of syntax elements of a VPS. Each of the one or more layers of video data may refer to the VPS, that is, the same VPS. In other words, the VPS may apply to all layers of a common set of video data, e.g., all SVC layers and/or all views of MVC video data.

The VPS may include various categories of information. For example, the VPS may include sample dimension counter description (SDCD). That is, for each dimension, the video coder may signal a set of indices. Possible dimensions include cnt_p: number of priority layers contained in the coded video sequence; cnt_d: how many different dependency layers in the bitstream, multiple layers with the same spatial resolution and bit depth may belong to different dependency layers; cnt_t: how many temporal layers in the bitstream; cnt_q: maximum number of quality layers for any dependency layer in the bitstream; and cnt_v: maximum number of views. The bit depth settings may include 8-bit or 12-bit and may be different for different color component. The chroma sampling formats may include 4:0:0, 4:2:0 and 4:4:4.

The VPS may also include a sample index to characteristics mapping. If for each dimension, the characteristics indicator is not equal to an index ranging from 0 to the sample dimension counter minus 1, a loop may be introduced to specify the characteristics indicator for each characteristics index. The mapping may include, for each dependency index, a specific spatial resolution with specific bit depth value and specific chroma sample format. Note that this might be omitted, if there is always a fixed look-up table at the decoder, e.g., 0 may correspond to 4:2:0, 1 may correspond to 4:4:4, and 2 may correspond to 4:0:0. The mapping may additionally or alternatively, include: for each temporal index/id, a specific frame rate or average frame rate; for each view index, a specific view id; for each bit depth index, a pair of specific bit depth values for luma and chroma; and for each chroma sampling format, a specific chroma sampling format indicator.

The VPS may also include control parameters and tool enabling/disabling flags, such as the following: a pcm_bit_depth_luma_minus1, a pcm_bit_depth_chroma_minus1, a loop_filter_across_slice_flag, a pcm_loop_filter_disable_flag, a temporal_id_nesting_flag, one or more tile related syntax elements, a chroma_pred_from_luma_enabled_flag, a sample_adaptive_offset_enabled_flag, an adaptive_loop_filter_enabled_flag, and an inter_4×4_enabled_flag.

The VPS may also include one or more operation point descriptions. Operation points generally describe a subset of a total number of views of video data included in a bitstream. An operation point may include a particular number of views targeted for output, as well as other views that may be used for reference when decoding, output, or both. A bitstream may include one or more operation points described by the operation point descriptions. The operation point descriptions may include information defining a number of maximum operation points, dependency between different layers or views, profile and level for each operation point, bit rate for each operation point, dependency between operation points, for each operation point, other restrictions, for each operation point, video usability information (VUI) or part of VUI, and/or for each layer or view, VUI or part of VUI. In addition, or in the alternative, the operation point descriptions may include, for each operation point, operation point video coding layer (VCL) network abstraction layer (NAL) unit representation. In some examples, the operation point VCL NAL unit representation may include, for each dimension, three possible choices: (1) a specific index value: e.g., for spatial resolution, for bit depth for chroma sampling format; (2) a range of the index value: e.g., for temporal layers, 0 to the highest temporal layer id, for quality layers, 0 to the highest quality layer id; or (3) a list of index values, e.g., for views, a list of view index values.

In some examples, the VPS may include data indicative of a maximum number of temporal layers among layers of a bitstream. That is, video encoder 20 and/or video decoder 30 may be configured to code a VPS including data indicative of a maximum number of temporal layers for a corresponding bitstream. For example, video encoder 20 may determine a maximum number of temporal layers and encode the VPS to include data representing the determined maximum number of temporal layers, whereas video decoder 30 may decode the VPS to determine the maximum number of temporal layers. Video encoder 20 and video decoder 30 may also code video data of the bitstream based on the determined maximum number of temporal layers. For example, the maximum number of temporal layers may influence a number of temporal identifiers that are needed to represent the various temporal layers. As another example, the maximum number of temporal layers may influence the manner in which video encoder 20 and video decoder 30 code reference picture identifiers, e.g., using picture order count (POC) values.

As still another example, video encoder 20 and video decoder 30 may be configured to code data of a particular temporal layer using only reference data up to and including the same temporal layer. In other words, video encoder 20 and video decoder 30 may be configured to avoid coding data of a particular temporal layer using reference data of a higher temporal layer. In this manner, video decoder 30 can be assured of accurately decoding video data of a given set of temporal layers even after sub-bitstream extraction. That is, if sub-bitstream extraction is performed, certain temporal layers above the highest layer of the extracted sub-bitstream will not be available for reference. By coding data of each temporal layer only with reference to data of layers at or below the current layer, errors can be avoided that may otherwise result from having data at a particular layer depend on data from a higher layer, which would be lost as a result of sub-bitstream extraction.

In some examples, the VPS, additionally or alternatively, includes data indicative of either or both of a number of pictures to be reordered in one or more layers of a bitstream and/or a number of pictures to be stored in a decoded picture buffer (DPB). As noted above, such data may be referred to as bitstream restriction information. Accordingly, destination device 14 may determine the capabilities of video decoder 30 and use the bitstream restriction information to determine whether the corresponding bitstream is appropriate for being decoded by video decoder 30, or whether destination device 14 should select alternative content (e.g., from a network-based content provider, assuming multiple versions of the content are available).

Moreover, video encoder 20 and video decoder 30 may use the bitstream restriction information during coding of the video data. For example, video encoder 20 may ensure that the bitstream restriction information is not violated. That is, assuming that the bitstream restriction information indicates that at most N pictures are to be stored in a DPB, video encoder 20 may ensure that no more than N pictures are included in any combination of one or more reference picture lists at any given time. As another example, assuming that the picture reordering information indicates that a picture is to be shifted by at most M pictures, video encoder 20 may ensure that no picture is shifted by more than M pictures. Shifting of pictures in this manner generally corresponds to the difference between decoding order and display order of a picture. Video decoder 30, likewise, may use such information during coding, e.g., to perform DPB management, such as DPB flushing. Video encoder 20 and video decoder 30 may also use bitstream restriction information, such as the maximum number of pictures to be stored in the DPB and/or the number of pictures to be reordered, when coding reference picture identifier values.

In some examples, the VPS, additionally or alternatively, includes data indicative of hypothetical reference decoder (HRD) parameters. HRD parameters include, for example, data describing times at which data is to be removed from a coded picture buffer (CPB). In decoders, such as video decoder 30, the CPB represents a buffer in which coded video data is stored until the data is ready for decoding. Decoders such as video decoder 30 may also include a decoded picture buffer (DPB), in which decoded video data is stored, e.g., to be used as reference data for inter-predicted data and for reordering of pictures from a decoding order to a display order.

The HRD parameters may include data indicating when particular pictures are to be removed from the CPB and decoded. Thus, video encoder 20 may encode the HRD parameters of the VPS to indicate when pictures can be removed from the CPB and decoded, while video decoder 30 may decode the HRD parameters of the VPS to determine when to remove pictures from the CPB. Likewise, video encoder 20 and video decoder 30 may code pictures according to the HRD parameters, e.g., in a coding order indicated by the HRD parameters. In this manner, video encoder 20 and/or video decoder 30 may be configured to code a VPS including HRD parameters, and to code video data corresponding to the VPS based at least in part on the HRD parameters.

The VPS may also include extension data indicating whether the VPS has been extended, e.g., to provide data for one or more additional coding tools. Such coding tools may be tools that are different than those of a corresponding video coding standard, such as, for example, ITU-T H.264/AVC or the upcoming HEVC standard. Moreover, such coding tools may require configuration data. This configuration data may be provided in the extension data of a VPS. In this manner, when coding video data using such coding tools, video encoder 20 and/or video decoder 30 may code a VPS indicating whether extension data is present, and if so, extension data of the VPS. Moreover, when such extension data is present, video encoder 20 and/or video decoder 30 may execute corresponding coding tools to code the video data using the extension data.

Various video coding standards define the corresponding syntax, semantics, and decoding process for error-free bitstreams, any of which conform to a certain profile or level. Video coding standards generally do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value. In accordance with the techniques of this disclosure, profile and level information may be specified in operation point descriptions, as discussed above.

In some examples, each layer or view of a bistream refers to the video parameter set (VPS), and a Layered sequence Parameter Set (LPS) can be active for each layer. An LPS may be kept as lightweight as possible by referring to the VPS in the design. The LPS may include any or all of the information discussed below. The LPS may include a sample dimension indication that indicates, for each dimension, an index to each dimension. For example, if in a VPS, an index to spatial resolution 0 is assigned to a spatial characteristic of 320×240 and an index to spatial resolution 1 is assigned to 640×480, and the current layer is to be assigned with resolution of 640×480, video encoder 20 and/or video decoder 30 may code a syntax element with a value of 1 for the current layer. That is, video encoder 20 may signal a value of 1 for the syntax element to specify the resolution of 640×480, whereas video decoder 30 may determine that a current layer with a syntax element having a value of 1 has a resolution of 640×480, based on the value of 1 for the syntax element.

The LPS may also include control parameters and tool enabling/disabling flags. For example, the control parameters and tool enabling/disabling flags may include a pcm_bit_depth_luma_minus1, a pcm_bit_depth_chroma_minus1, a loop_filter_across_slice_flag, a pcm_loop_filter_disable_flag, one or more tile related syntax elements, a chroma_pred_from_luma_enabled_flag, a sample_adaptive_offset_enabled_flag, an adaptive_loop_filter_enabled_flag, and a coding unit (CU) hierarchy.

The LPS may further include information of other types of parameter sets applying to a slice, a group of slices, a picture, or several pictures. Each of these parameter sets may refer to a specific picture parameter set (PPS).

The video coder, such as video encoder 20 and video decoder 30, may be configured to ensure and/or determine that a PPS does not refer to an LPS or a VPS. Thus, the video coder may ensure that each PPS of a bitstream does not refer to an LPS or a VPS. Parsing of a PPS may be independent. When a PPS includes one or more of the same syntax elements as those of a VPS or an LPS, the syntax elements of the PPS may overwrite those of the VPS or LPS.

A video coder may further be configured to code a grouping parameter set (GPS) that groups all parameter sets together. The video coder may code a plurality of different groups within the GPS, each having individual GPS identifiers (ids). Each of the groups in the GPS may include a different combination of parameter sets. In this manner, a slice header need only include a reference to a corresponding GPS id, and need not include an indication of a type of parameter set. U.S. Provisional Patent Application Ser. No. 61/590,702, filed Jan. 25, 2012, also describes techniques in which different types of parameter sets are grouped together and only the ID of the Parameter Set Grouping RBSP is signaled in the slice header in greater detail.

As discussed above, the video coder, such as video encoder 20 or video decoder 30, may be configured to code a video parameter set and/or a grouping parameter set. Examples of a video parameter set are discussed in greater detail with respect to FIG. 5, while examples of a grouping parameter set are discussed in greater detail with respect to FIG. 6.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
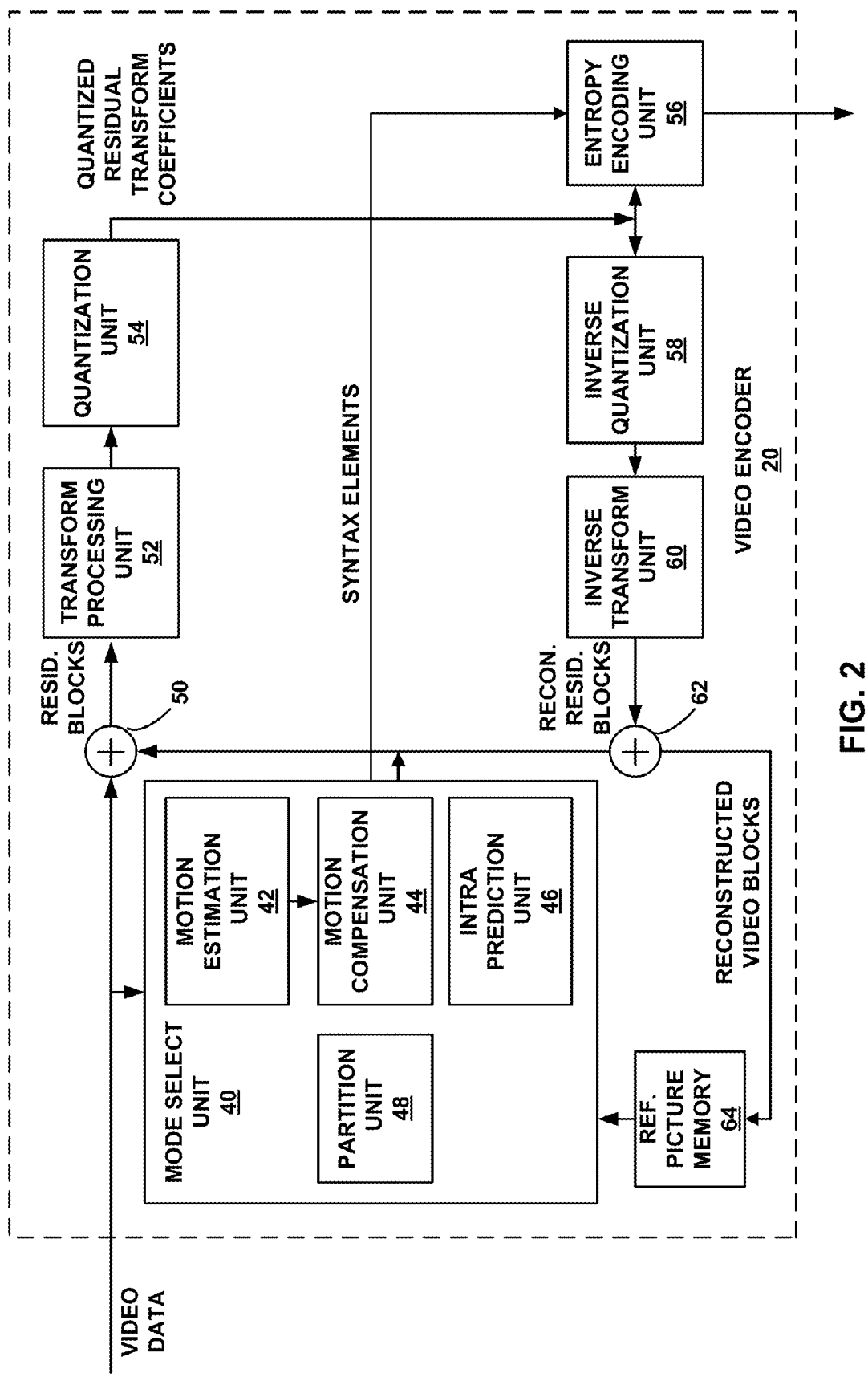
FIG. 2 is a block diagram illustrating an example of video encoder 20 that may implement techniques for coding parameter sets and NAL units for one or more layers of video data.

FIG. 2 is a block diagram illustrating an example of video encoder 20 that may implement techniques for coding parameter sets and NAL units for one or more layers of video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Video encoder 20 may further be configured to code a video parameter set (VPS), a layer parameter set (LPS), and/or a grouping parameter set, in accordance with the techniques of this disclosure, as well as a sequence parameter set (SPS), picture parameter set (PPS), adaptation parameter set (APS), or other such signaling data structures. More particularly, entropy encoding unit 56 may be configured to code any or all of these data structures. To the extent that parameters of these various data structures may impact coding performance, mode select unit 40 may select appropriate parameters and pass the parameters to entropy encoding unit 56 for inclusion within, e.g., a VPS. Other parameters, such as a number of temporal layers, a number of pictures to be reordered, and a number of pictures to be stored in a decoded picture buffer, may be selected by a user, e.g., an administrator. In other examples, certain parameters, such as HRD parameters, may arise through the encoding process.

Entropy encoding unit 56 may code a VPS to include any or all of the various types of data described by this disclosure. Video encoder 20 may also encode data in accordance with the parameters of the VPS. More particularly, video encoder 20 may code sequences of pictures among one or more layers of video data to which the VPS corresponds in accordance with the parameters of the VPS.

In this manner, video encoder 20 of FIG. 2 represents an example of a video encoder configured to code a video parameter set (VPS) for one or more layers of video data, wherein each of the one or more layers of video data refer to the VPS, and code the one or more layers of video data based at least in part on the VPS.

Although generally described with respect to a video encoder, encoding of a VPS may be performed by other devices, e.g., a media-aware network element (MANE). A MANE may correspond to a network element between a source device (such as source device 12 of FIG. 1) and a destination device (such as destination device 14). The MANE may be configured to encode a VPS in accordance with the techniques of this disclosure. The MANE may generate the VPS using data of other data structures received by the MANE, e.g., sequence parameter sets.

Figure 3:
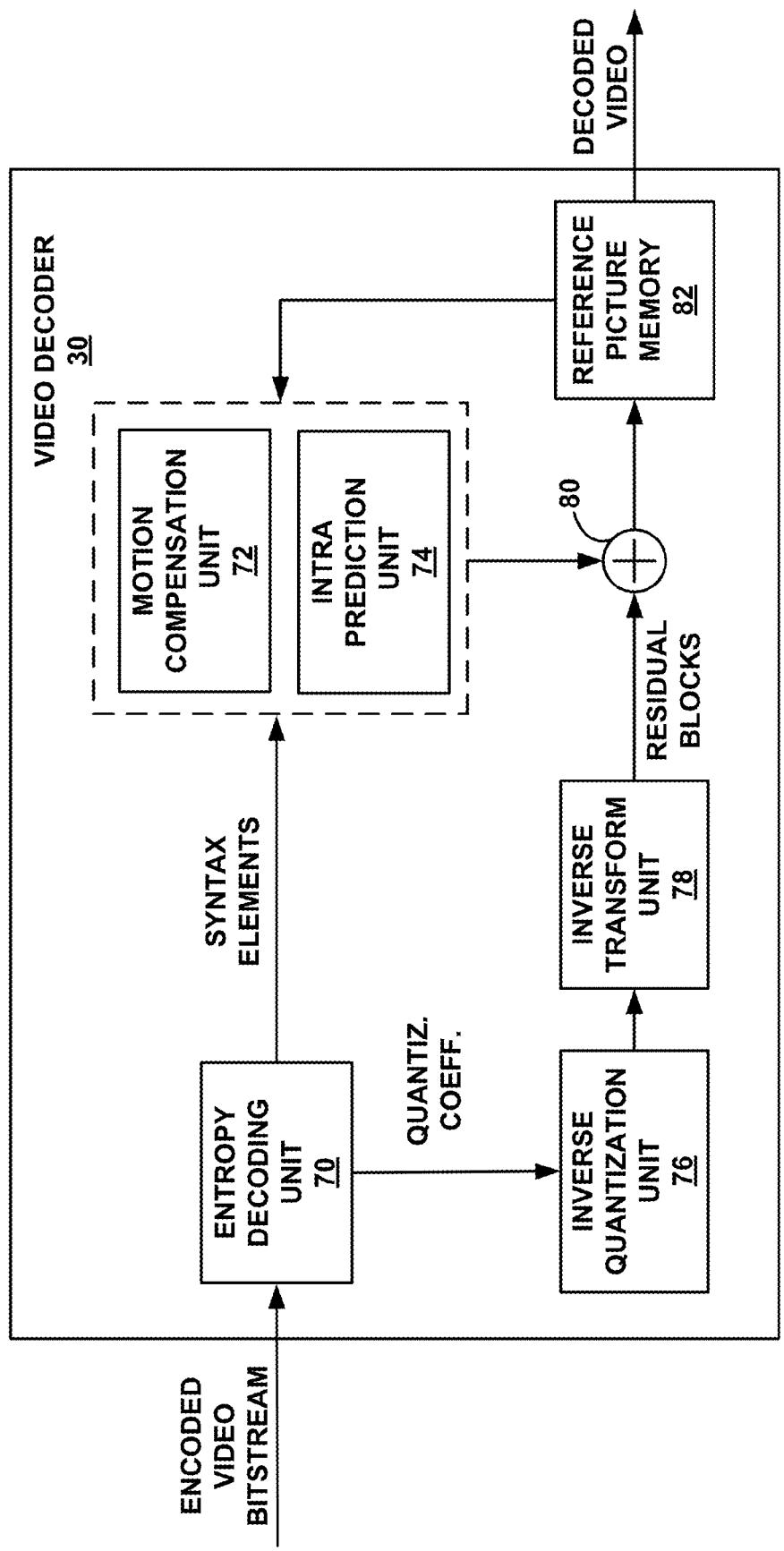
FIG. 3 is a block diagram illustrating an example of video decoder 30 that may implement techniques for coding parameter sets and NAL units for one or more layers of video data.

FIG. 3 is a block diagram illustrating an example of video decoder 30 that may implement techniques for coding parameter sets and NAL units for one or more layers of video data. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Reference picture memory 82 may also be referred to as a "decoded picture buffer," or DPB. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 80. The inverse quantization process may include use of a quantization parameter QPY calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In accordance with the techniques of this disclosure, video decoder 30 may decode a video parameter set (VPS), a layer parameter set (LPS), and/or a grouping parameter set, in accordance with the techniques of this disclosure, as well as a sequence parameter set (SPS), picture parameter set (PPS), adaptation parameter set (APS), or other such signaling data structures. More particularly, entropy decoding unit 70 may be configured to decode any or all of these data structures. By decoding these various data structures, entropy decoding unit 70 may determine parameters to be used for decoding corresponding video data. For example, video decoder 30 may decode corresponding sequences of video data of one or more layers using parameters of a decoded VPS.

Although not shown in FIG. 3, video decoder 30 may additionally include a coded picture buffer (CPB). The CPB would ordinarily be provided before entropy decoding unit 70. Alternatively, the CPB may be coupled to entropy decoding unit 70 for temporary storage, or at the output of entropy decoding unit 70 for storing entropy-decoded data until such data is to be decoded. In general, the CPB stores coded video data until the coded video data is to be decoded, e.g., as indicated by HRD parameters, which video decoder 30 may extract from a decoded VPS. Likewise, other elements of video decoder 30 may be configured to decode video data using, e.g., the VPS. For example, video decoder 30 may decode temporal identifiers for pictures of various temporal layers, data indicating a number of pictures to be reordered and/or stored in reference picture memory 82 (representing a DPB).

Moreover, video decoder 30 may include additional processing units for processing video data according to various coding tools provided by extensions of a video coding standard. Alternatively, existing elements of video decoder 30 shown in FIG. 3 may be configured to execute the coding tools of such extensions. Entropy decoding unit 70 may be configured to decode VPS extension data and provide such extension data to the units configured to execute the coding tools provided by the extensions.

In this manner, video decoder 30 of FIG. 3 represents an example of a video decoder configured to code a video parameter set (VPS) for one or more layers of video data, wherein each of the one or more layers of video data refer to the VPS, and code the one or more layers of video data based at least in part on the VPS.

Although generally described with respect to a video decoder, decoding of a VPS may be performed by other devices, e.g., a media-aware network element (MANE). The MANE may be configured to decode a VPS in accordance with the techniques of this disclosure. The MANE may further generate other parameter set data, such as one or more sequence parameter sets, using the data of the VPS. In this manner, the MANE may provide for backwards-compatibility with previous standards, such as ITU-T H.264/AVC.

Figure 4:
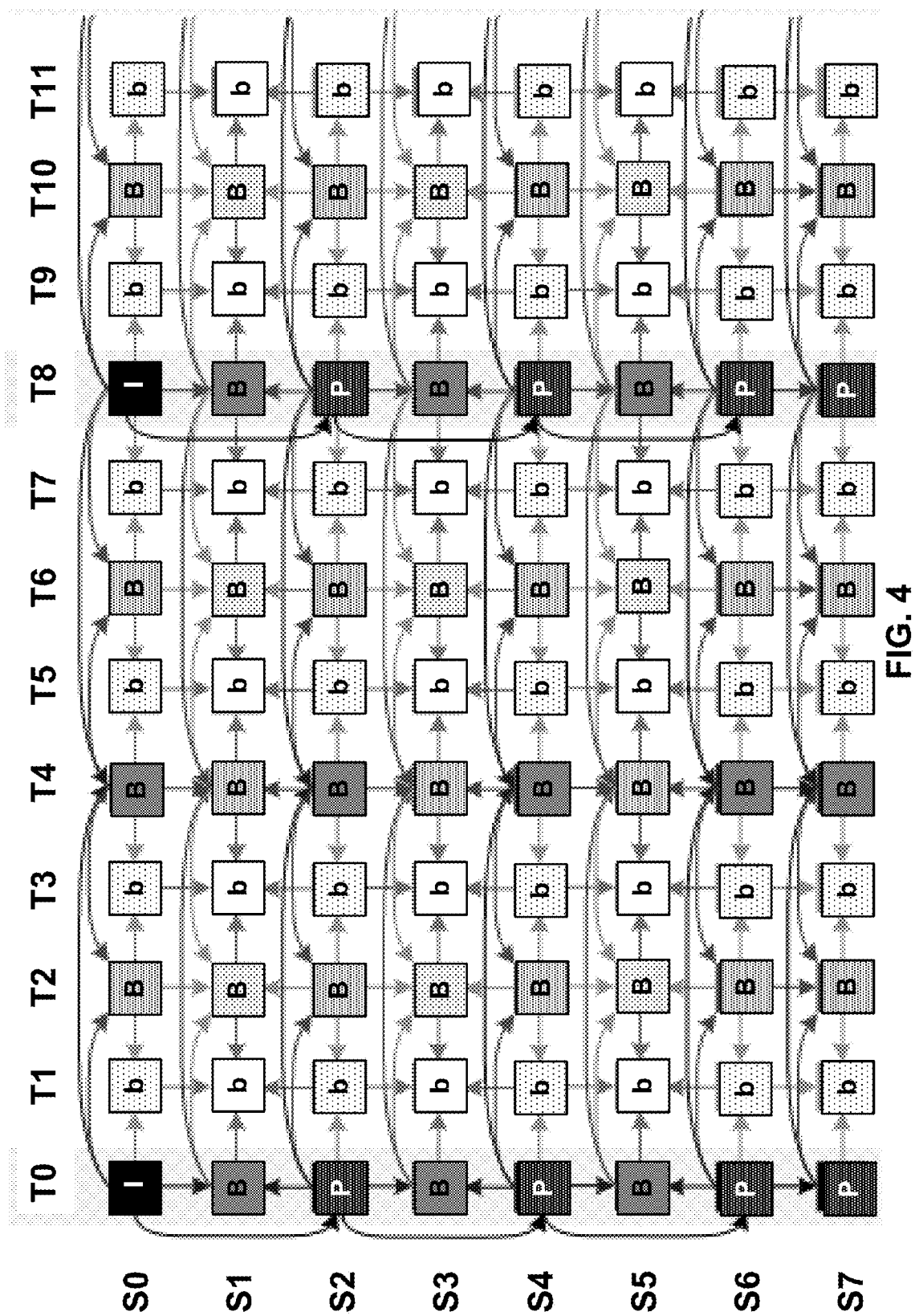
FIG. 4 is a conceptual diagram illustrating an example MVC prediction pattern.

FIG. 4 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

A typical MVC prediction (including both inter-picture prediction within each view and inter-view prediction) structure for multi-view video coding is shown in FIG. 4, where predictions are indicated by arrows, the pointed-to object using the point-from object for prediction reference. In MVC, the inter-view prediction is supported by disparity motion compensation, which may use the syntax of the H.264/AVC motion compensation, but allows a picture in a different view to be used as a reference picture.

Coding of two views could also be supported by MVC, and one of the advantages of MVC is that an MVC encoder could take more than two views as a 3D video input and an MVC decoder can decode such a multiview representation. So any renderer with MVC decoder may be configured to receive 3D video content with more than two views.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order.

Frames in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So a rendering device with an MVC decoder may expect 3D video contents with more than two views.

In MVC, inter-view prediction (IVP) is allowed among pictures in the same access unit (that is, with the same time instance). An access unit is, generally, a unit of data including all view components (e.g., all NAL units) for a common temporal instance. Thus, in MVC, inter-view prediction is permitted among pictures in the same access unit. When coding a picture in one of the non-base views, the picture may be added into a reference picture list, if it is in a different view but with the same time instance (e.g., the same POC value, and thus, in the same access unit). An inter-view prediction reference picture may be put in any position of a reference picture list, just like any inter prediction reference picture.

In the context of multi-view video coding, there are two kinds of motion vectors. One is normal motion vectors pointing to temporal reference pictures, and the corresponding inter prediction mode is referred to as motion compensated prediction (MCP). The other is disparity motion vectors pointing to pictures in a different view, and the corresponding inter-view prediction mode is referred to as disparity-compensated prediction (DCP).

In conventional HEVC, there are two modes for the prediction of motion parameters: one is merge mode, and the other is advanced motion vector prediction (AMVP). In the merge mode, a candidate list of motion parameters (reference pictures, and motion vectors) is constructed where the candidate can be from spatial or temporal neighboring blocks. The spatially and temporally neighboring blocks may form a candidate list, that is, a set of candidates from which motion prediction information may be selected. Accordingly, video encoder 20 may code the motion parameters chosen as motion prediction information by coding an index into the candidate list. After video decoder 30 has decoded the index, all the motion parameters of the corresponding block where the index points to may be inherited, in merge mode.

In AMVP, accordingly conventional HEVC, a candidate list of motion vector predictors for each motion hypothesis is derived based on the coded reference index. This list includes motion vectors of neighboring blocks that are associated with the same reference index as well as a temporal motion vector predictor which is derived based on the motion parameters of the neighboring block of the co-located block in a temporal reference picture. The chosen motion vectors are signaled by transmitting an index into the candidate list. In addition, the reference index values and motion vector differences are also signaled.

FIG. 4 provides various examples of inter-view prediction. Frames of view S1, in the example of FIG. 4, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between frames, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. In some examples, the decoding of the view components shall follow the ascending order of the view order index. If all the views are presented, then the view order indexes are in a consecutive order from 0 to num_views_minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views 51 and S3, a decoding order does not matter, because views 51 and S3 do not rely on each other for prediction, but instead are predicted only from views that are higher in the prediction hierarchy. Moreover, view 51 may be decoded before view S4, so long as view 51 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 4. Also, with respect to the example of FIG. 4, S0>S1, S2>S1, S2>S3, S4>S3, S4>S5, and S6>S5. Any decoding order for the views that does not violate these requirements is possible. Accordingly, many different decoding orders are possible, with only certain limitations.

In accordance with the techniques of this disclosure, each of views S0-S7 may be considered a respective layer of a corresponding bitstream. Thus, a VPS may describe parameters of the bitstream applicable to any or all of views S0-S7, while individual layer parameter sets may be provided for any or all of views S0-S7. In addition, a grouping parameter set may be provided for a group of parameter sets, such that slices within individual pictures of views S0-S7 may simply refer to the identifier of a grouping parameter set.

As shown in FIG. 4, a view component can use the view components in other views for reference. This is referred to as inter-view prediction. In MVC, inter-view prediction is realized as if the view component in another view was an inter prediction reference. Video encoder 20 and video decoder 30 may code the potential inter-view references in the Sequence Parameter Set (SPS) MVC extension (as shown in the example of Table 1). Video encoder 20 and video decoder 30 may further modify the potential inter-view references by executing the reference picture list construction process, which may enable flexible ordering of the inter prediction or inter-view prediction references.

TABLE 1

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |

TABLE 1-continued

| seq_parameter_set_mvc_extension( ) { | C | Descriptor |
|---|---|---|
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1[ i ]; j++ ) | | |
|     non_anchor_ref_l1[ i ][ j ] | 0 | ue(v) |
| } | | |
| num_level_values_signaled_minus1 | 0 | ue(v) |
| for( i = 0; i <= num_level_values_signaled_minus1; i++ ) { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
|   } | | |
| } | | |
| } | | |

In the SPS MVC extension shown in Table 1, for each view, the number of views that can be used to form reference picture list 0 and reference picture list 1 are signaled. Prediction relationship for an anchor picture, as signaled in the SPS MVC extension, can be different from the prediction relationship for a non-anchor picture (signaled in the SPS MVC extension) of the same view.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD4 hereinafter, is available from http://phenix.int-evey.fr/jct/doc_end_user/documents/6_Torino/wg11/JCTVC-F803-v3.zip, denoted as HEVC WD4d1.

The sequence and picture parameter set mechanism decouples the transmission of infrequently changing information from the transmission of coded block data. Sequence and picture parameter sets may, in some applications, be conveyed "out-of-band" using a reliable transport mechanism. A picture parameter set raw byte sequence payload (RBSP) may include parameters that can be referred to by the coded slice network abstraction layer (NAL) units of one or more coded pictures. A sequence parameter set RBSP may include parameters that can be referred to by one or more picture parameter set RBSPs or one or more supplemental enhancement information (SEI) NAL units containing a buffering period SEI message. A sequence parameter set RBSP may include parameters that can be referred to by one or more picture parameter set RBSPs or one or more SEI NAL units containing a buffering period SEI message.

The sequence parameter set may include an optional set of parameters called video usability information (VUI). VUI may include the following three categories of optional information: video representation information, Hypothetical Reference Decoder (HRD) information, and bitstream restriction information. Video representation information includes the aspect ratio, color space transform related information chroma phase shifts relative to luma and frame rate. HRD includes video buffering parameters for the coded video sequences. Bitstream restriction information includes restrictions on motion vector range, decoded picture buffer (DPB) size, and number of reordering frames and the coded sizes of blocks (e.g., macroblocks or coding units (CUs)) and pictures.

HEVC WD5 includes the support adaptation parameter set (APS). The concept of adaption parameter set (APS) can also be found in JCTVC-F747, available from http://phenix.int-evry.fr/jct/doc_end_user/documents/6_Torino/wg11/JCTVC-F747-v4.zip.

A unified NAL unit header may be used for both the HEVC non-scalable bitstreams as well as the scalable bitstreams conforming to the potential scalable or multiview extensions of HEVC. A unified NAL unit header may differ from the current HEVC NAL unit header in the following aspects: there may be a fixed NAL unit header length for one whole coded video sequence, while the length can vary across different coded video sequences, and efficient coding of the scalability syntax elements in the NAL unit header, and when a particular syntax element it is not needed it need not be present. In such a design, a different NAL unit type or parameter set can be used for the whole bitstream.

Figure 5:
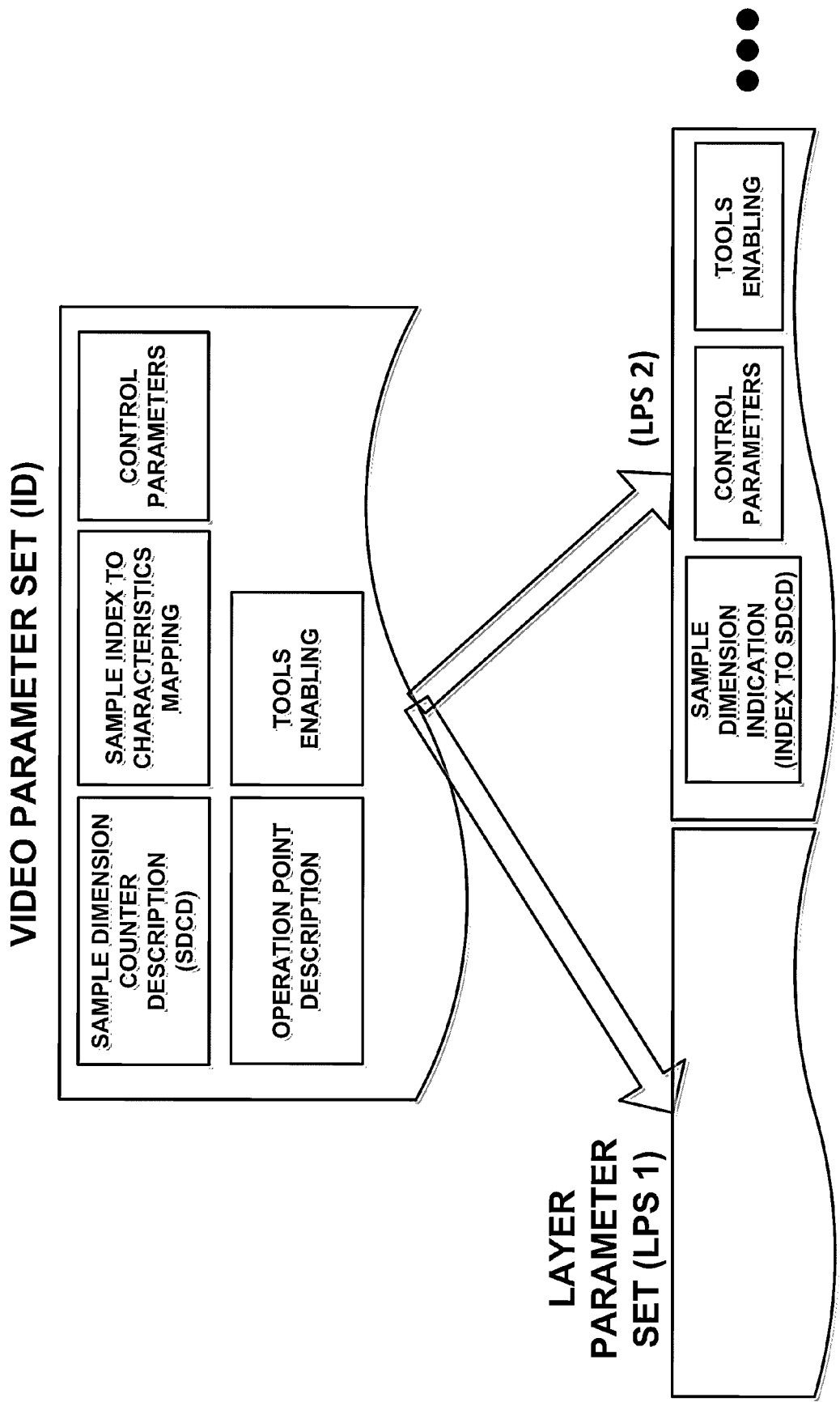
FIG. 5 is a conceptual diagram illustrating a video parameter set (VPS) and various layer parameter sets (LPSs).

FIG. 5 is a conceptual diagram illustrating a video parameter set (VPS) and various layer parameter sets (LPSs). The ellipses following the second LPS in FIG. 5 are intended to indicate that there may be any number N of VPSs, where N is an integer. For example, each layer (e.g., each SVC layer or each MVC view) may have a corresponding LPS. A video coder, such as video encoder 20 or video decoder 30, may be configured to code a VPS and one or more LPSs, such as those illustrated in FIG. 5.

Table 2 below provides an example raw byte sequence payload (RBPS) syntax for a VPS.

TABLE 2

| video_parameter_set_rbsp( ) { | Descriptor |
|---|---|
|   video_para_set_id | u(8) |
|   // sample dimension counter description | |
|   cnt_p | u(3) |
|   cnt_d | u(3) |
|   cnt_t | u(3) |
|   cnt_q | u(3) |
|   cnt_v | u(4) |
|   cnt_f | u(4) |
|   // sample index to characteristic mapping | |

TABLE 2-continued

| video_parameter_set_rbsp( ) { | Descriptor |
|---|---|
|   for( i = 0; i < cnt_d; i++) { | |
|     pic_width_in_luma_samples[ i ] | ue(v) |
|     pic_height_in_luma_samples[ i ] | ue(v) |
|     bit_depth_luma_minus8[ i ] | ue(v) |
|     bit_depth_chroma_minus8[ i ] | ue(v) |
|     chroma_format_idc[ i ] | u(2) |
|   } | |
|   for( i = 0; i < cnt_t; i++) | |
|     averge_frame_rate[ i ] | u(16) |
|   if( cnt_v > 1 ) | |
|     for( i=0; i < cnt_v; i++) | |
|       view_id[ i ] | ue(v) |
|   // control parameters and tool enabling/disabling flags | |
|   log2_max_pic_order_cnt_lsb_minus4 | ue(v) |
|   chroma_pred_from_luma_enabled_flag | u(1) |
|   loop_filter_across_slice_flag | u(1) |
|   sample_adaptive_offset_enabled_flag | u(1) |
|   adaptive_loop_filter_enabled_flag | u(1) |
|   pcm_loop_filter_disable_flag | u(1) |
|   cu_qp_delta_enabled_flag | u(1) |
|   temporal_id_nesting_flag | u(1) |
|   inter_4x4_enabled_flag | u(1) |
|   operation_point_desription( ) | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

Video coders may be configured such that a coded video sequence (e.g., a bitstream including one or more layers) can only have one active video parameter set (VPS). The VPS may be encapsulated within a NAL unit of a particular type. For example, the nal_unit_type for a VPS RBSP may be 10. Example semantics for the VPS of Table 2 are described below:

In this example, video_para_set_id identifies a corresponding video parameter set (VPS).

In this example, cnt_p specifies the maximum number of priority_id values present in the corresponding coded video sequence.

In this example, cnt_d specifies the maximum number of dependency layers present in the corresponding coded video sequence. Multiple views with the same resolution may be considered as belonging to a same dependency layer. Two dependency layers may have a same spatial resolution.

In this example, cnt_t specifies the maximum number of temporal layers present in the coded video sequence.

In this example, cnt_q specifies the maximum number of quality layers present in a dependency layer in the coded video sequence.

In this example, cnt_v specifies the maximum number of views present in the coded video sequence.

In this example, cnt_f specifies the number of bits used to represent the reserved_flags syntax element in the NAL unit header.

In this example, pic_width_in_luma_samples[i] and pic_height_in_luma_samples[i] specify, respectively, the width and height of the i-th dependency layer resolution in units of luma samples.

In this example, bit_depth_luma_minus8[i] plus 8 and bit_depth_chroma_minus8[i] plus 8 specifies the bit depth of the luma and chroma components of the i-th bit depth representation.

In this example, chroma_format_idc[i] specifies the chroma sample format of the i-th chroma sample format representation. For example, a value equal to 0 may indicate 4:2:0; a value equal to 1 may indicate 4:4:4, a value equal to 2 may indicate 4:2:2 and a value equal to 3 may indicate 4:0:0.

In this example, average_frame_rate[i] specifies the average frame rate of the i-th temporal layer representation, in in units of frames per 256 seconds.

In this example, view_id[i] specifies the view identifier of the i-th view, which has view order index equal to i. When not present, the value of view_id[0] may be inferred to be 0. vps_extension_flag equal to 0 specifies that no vps_extension_data_flag syntax elements are present in the video parameter set RBSP syntax structure. vps_extension_flag may be equal to 0 in bitstreams conforming to the upcoming HEVC standard. The value of 1 for vps_extension_flag may be reserved, e.g., for future use by ITU-T|ISO/IEC. Decoders, such as video decoder 30, may ignore all data that follow the value 1 for vps_extension_flag in a video parameter set NAL unit.

In this example, vps_extension_data_flag may have any value. It does not affect the conformance to profiles specified in the upcoming HEVC standard, but allows for further development of the upcoming standard.

Other syntax elements in the VPS may have the same semantics as the syntax elements with the same names in the SPS of the current HEVC working draft. Those syntax elements may apply to the coded video sequence that refers to this VPS, unless overwritten by lower level parameter sets.

In some examples, a 3DV_flag may be further signaled in the VPS to indicate if the depth is present in the coded video sequence.

In some examples, VUI parameters are signaled in the LPS.

In some examples, the syntax elements cnt_p, cnt_t, cnt_d, cnt_q, and cnt_v specify the numbers of bits used to code priority_id, temporal_id, dependency_id, quality_id and view_idx, respectively, and the maximum numbers of priority_id values, temporal layers, dependency layers, quality layers, and views present in the coded video sequences are may also be signaled in the VPS.

In some examples, another type of NAL unit may be introduced to contain the syntax elements cnt_p, cnt_t, cnt_d, cnt_q, cnt_v and cnt_f. This new NAL unit type may also include an identifier (ID), and the ID may be referred to in the VPS.

In some examples, the syntax elements from log 2_max_pic_order_cnt_lsb_minus4 to inter_4x4_enabled_flag in Table 2 are not signaled in the VPS, but instead, video encoder 20 and video decoder 30 may code these syntax elements in the LPS.

In some examples, the operation_point_desription( ) syntax structure of Table 2 is not included in the VPS; instead, video encoder 20 and video decoder 30, or other elements (e.g., output interface 22 and/or input interface 28), may code the content in the operation_point_desription( ) syntax structure in a supplemental enhancement information (SEI) message.

In some examples, video encoder 20 and/or video decoder 30 may code video usability information (VUI) parameters in the VPS. For example, a VPS may include data specifying bitstream restriction information, such as restrictions on motion vector range, DPB size, number of reordering frames, and coded sizes of blocks (e.g., macroblocks or CUs) and pictures. In this manner, a VPS may specify information indicating a required DPB size in order for a video decoder (such as video decoder 30) to properly decode a corresponding bitstream, that is, a bitstream including the VPS. Likewise, a VPS may specify picture reordering information, that is, a number of pictures that may precede a given picture in decoding order and that succeed the given picture in output order (that is, display order).

Additionally or alternatively, a VPS may include data specifying hypothetical reference decoder (HRD) information. As noted above, video encoder 20 and/or video decoder 30 may code (that is, signal) VUI parameters, which may include HRD information, in the VPS. Thus, a VPS may include data describing, for example, operation points of a corresponding bitstream. For example, a VPS may include data describing one or more of a number of maximum operation points, dependencies between different layers or views, profile and level information for each operation point, operation point VCL NAL unit representation for each operation point, bit rate for each operation point, dependency between operation points, restrictions for each operation point, VUI or partial VUI for each operation point, and/or VUI or partial VUI for each layer or view.

A VPS may also include, for each dimension: a specific index value, a range of index values, or a list of index values. For example, when a VPS includes data describing a specific index value, the index value may correspond to, for spatial resolution, bit depth for chroma sampling format. As another example, when a VPS includes a range of index values, for temporal layers, the range may comprise zero (0) to the highest temporal layer ID, and for quality layers, the range may comprise zero (0) to the highest quality layer ID. As still another example, when a VPS includes data describing a list of index values, the list may comprise a list of view index values for multiple views.

In some examples, video encoder 20 may encode (that is, signal), and video decoder may decode, one or more representation format parameters (width, height, bit depth etc.), and there may be different sets of representation format parameters. A layer or operation point may then refer to an index of such a set of representation format parameters. An example of the syntax design for such a set is shown in Table 3 below.

TABLE 3

| | Descriptor |
|---|---|
| num_rep_formats_minus1 | ue(v) |
| for( i = 0; i <= num_rep_formats_minus1; i++ ) { | |
|   pic_width_in_luma_samples[ i ] | ue(v) |
|   pic_height_in_luma_samples[ i ] | ue(v) |
|   bit_depth_luma_minus8[ i ] | ue(v) |
|   bit_depth_chroma_minus8[ i ] | ue(v) |
|   chroma_format_idc[ i ] | u(2) |
| } | |
| for( i = 0; i < cnt_d; i++) { | |
|   rep_format_idx[ i ] | ue(v) |
| } | |

In some examples, the ref_format_idx may instead be signaled in the layer parameter set.

Table 4 below provides example syntax for operation point descriptions.

TABLE 4

| operation_points_description( ) { | Descriptor |
|---|---|
| num_operation_point_minus1 | ue(v) |
| for( i = 0; i <= num_operation_points_minus1; i++ ) { | |
|   op_profile_level_idc[ i ] | u(24) |
|   operation_point_id[ i ] | ue(v) |
|   priority_id[ i ] | ue(v) |
|   temporal_id[ i ] | ue(v) |

TABLE 4-continued

| operation_points_description( ) { | Descriptor |
|---|---|
|   quality_id[ i ] | ue(v) |
|   dependency_id[ i ] | ue(v) |
|   if (cnt_v > 1) { | |
|     num_target_output_views_minus1[ i ] | ue(v) |
|     for( j = 0; j <= num_target_output_views_minus1[ i ]; j++ ) | |
|       view_idx[ i ][ j ] | ue(v) |
|   } | |
|   frm_rate_info_present_flag[ i ] | u(1) |
|   avg_bitrate[ i ] | u(16) |
|   max_bitrate[ i ] | u(16) |
|   max_bitrate_calc_window[ i ] | u(16) |
|   constant_frm_rate_idc[ i ] | u(2) |
|   if (cnt_v >1) { | |
|     num_directly_dependent_views[ i ] | |
|     for( j = 0; j < num_directly_dependent_views[ i ]; j++ ) { | |
|       directly_dependent_view_idx[ i ][ j ] | |
|     } | |
|   } | |
| } | |
| if (cnt_v > 1 ) | |
|   for( i = 1; i < cnt_v; i++ ) { | |
|     num_ref_views[ i ] | ue(v) |
|     for( j = 0; j < num_ref_views[ i ]; j++ ) | |
|       ref_view_idx[ i ][ j ] | ue(v) |
|   } | |
| } | |

Examples of the semantics for the syntax elements of Table 4 are discussed below:

In this example, num_operation_point_minus1 plus 1 specifies the maximum number of operation points that are present in the coded video sequence and for which the operation point information is signaled by the following syntax elements.

In this example, op_profile_level_idc[i], operation_point_id[i], priority_id[i], num_target_output_views_minus1[i], frm_rate_info_present_flag[i], avg_bitrate[i], max_bitrate[i], max_bitrate_calc_window[i], constant_frm_rate_idc[i] and num_directly_dependent_views[i] may have the same semantics as the syntax elements with the same names in view scalability information SEI message of H.264.

In this example, quality_id[i] and dependency_id[i] may have the same semantics as the syntax elements with the same names in scalability information SEI message of H.264.

In this example, directly_dependent_view_idx[i][j] specifies the view index of the j-th view that the target output view of the current operation point is directly dependent on within the representation of the current operation point.

In this example, num_ref_views[i] specifies the number of view components for inter-view prediction in the initial reference picture list RefPicList0 and RefPicList1 in decoding view components with view order index equal to i. In this example, the value of num_ref_views[i] shall not be greater than Min(15, num_views_minus1). In some examples, the value of num_ref_views[0] is equal to 0.

In this example, ref_view_idx[i][j] specifies the view order index of the j-th view component for inter-view prediction in the initial reference picture list RefPicList0 and RefPicList1 in decoding a view component with view order index equal to i. In this example, the value of ref_view_idx [i][j] shall be in the range of 0 to 31, inclusive.

In some examples, as an alternative, some of the syntax elements in the scalability information SEI message (e.g., as described in H.264), for example, the layer dependency information related syntax elements, may be included in the operation_points_description( ) syntax structure of Table 4.

In some examples, video encoder 20 and/or video decoder 30 may code (that is, signal) some VUI parameters in the operation_points_description( ) syntax structure of Table 4.

Table 5 below provides alternative syntax for a video parameter set:

TABLE 5

| video_parameter_set_rbsp( ) { | Descriptor |
|---|---|
| video_parameter_set_id | ue(v) |
| num_temporal_layers_minus1 | u(3) |
| for ( i = 0; i <= num_temporal_layers_minus1; i++ ) { | |
|   profile_idc[ i ] | u(8) |
|   reserved_zero_8bits[ i ] /* equal to 0 */ | u(8) |
|   level_idc[ i ] | u(8) |
| } | |
| bit_depth_luma_minus8 | ue(v) |
| bit_depth_chroma_minus8 | ue(v) |
| chroma_format_idc | u(2) |
| pic_width_in_luma_samples | ue(v) |
| pic_height_in_luma_samples | ue(v) |
| pic_cropping_flag | u(1) |
| if( pic_cropping_flag ) { | |
|   pic_crop_left_offset | ue(v) |
|   pic_crop_right_offset | ue(v) |
|   pic_crop_top_offset | ue(v) |
|   pic_crop_bottom_offset | ue(v) |
| } | |
| temporal_id_nesting_flag | u(1) |
| bit_equal_to_one /* equal to 1 */ | u(1) |
| extension_type /* equal to 0 for 3DV */ | ue(v) |
| num_layers_minus2 | ue(v) |
| num_rep_formats_minus1 | ue(v) |
| for( i = 1; i <= num_rep_formats_minus1; i++ ) { | |
|   bit_depth_luma_minus8[ i ] | ue(v) |
|   bit_depth_chroma_minus8[ i ] | ue(v) |
|   chroma_format_idc[ i ] | u(2) |
|   pic_width_in_luma_samples[ i ] | ue(v) |
|   pic_height_in_luma_samples[ i ] | ue(v) |
|   pic_cropping_flag[ i ] | u(1) |
|   if( pic_cropping_flag[ i ] ) { | |
|     pic_crop_left_offset[ i ] | ue(v) |
|     pic_crop_right_offset[ i ] | ue(v) |
|     pic_crop_top_offset[ i ] | ue(v) |
|     pic_crop_bottom_offset[ i ] | ue(v) |
|   } | |
| } | |
| for( i = 1; i <= num_layers_minus1; i++ ) { | |
|   rep_format_idx[ i ] | ue(v) |
|   if( extension_type = = 1) { | |
|     dependency_id[ i ] | ue(v) |
|     quality_id[ i ] | ue(v) |
|     num_directly_dependent_layers[ i ] | ue(v) |
|     for( j = 0; j < num_directly_dependency_layers[ i ]; j++ ) | |
|       delta_reference_layer_id_minus1[ i ][ j ] | ue(v) |
|   } | |
| } | |
| num_short_term_ref_pic_sets | ue(v) |
| for( i = 0; i < num_short_term_ref_pic_sets; i++) | |
|   short_term_ref_pic_set( i ) | |
| if ( extension_type = = 0 ) | |
|   view_dependency( ) | |
| num_additional_profiles_levels_minus1 | ue(v) |
| for( i = 0; i <= num_additional_profiles_levels_minus1; i++ ) { | |
|   additional_profile_idc[ i ] | u(8) |
|   additional_reserved_zero_8bits[ i ] /* equal to 0 */ | u(8) |
|   additional_level_idc[ i ] | u(8) |
|   num_applicable_operation_points_minus1[ i ] | ue(v) |
|   for( j = 0; j <= num_applicable_operation_points[ i ]; j++ ) { | |

TABLE 5-continued

| video_parameter_set_rbsp( ) { | Descriptor |
|---|---|
|     temporal_id[ i ][ j ] | ue(v) |
|     layer_id[ i ][ j ] | ue(v) |
|     if( extension_type = = 0 ) { /* Always true for 3DV */ | |
|       depth_included_flag | u(1) |
|       num_target_output_views_minus1[ i ][ j ] | ue(v) |
|       for( k = 0; | |
|       k < num_target_output_views_minus1[ i ][ j ]; | |
|       k++ ) | |
|         layer_id[ i ][ j ][ k ] | ue(v) |
|     } | |
|     else (extension_type = = 1) | |
|       layer_id[ i ][ j ] | ue(v) |
|   } | |
| } | |
| vps_vui_parameters_present_flag | u(1) |
| if( vps_vui_parameters_present_flag ) | |
|   vps_vui_parameters( ) | |
| vps_extension_flag | u(1) |
| if( vps_extension_flag ) | |
|   while( more_rbsp_data( ) ) | |
|     vps_extension_data_flag | u(1) |
| rbsp_trailing_bits( ) | |
| } | |

Examples of the semantics for the syntax of the video parameter set of Table 5 are discussed below. In general, similarly named syntax elements that are not discussed below may have the same semantics as discussed above with respect to Table 2. Semantics for other syntax elements may be as follows:

In this example, bit_equal_to_one is equal to 1 (that is, a binary "1" value).

In this example, extention_type equal to 0 indicates that multiple view layers may be present in the bitstream. In this example, extension_type equal to 1 specifies that multiple dependency and/or quality layers may be present in the bitstream.

In this example, num_rep_formats_minus1 plus 1 specifies the maximum number of different sets representation formats supported by this video parameter set, a representation format include bit depth and chroma format (i.e., the sets of bit_depth_luma_minus8, bit_depth_chroma_minus8, and chroma_format_idc values), picture resolution and cropping window information in the coded video sequence. The value of num_rep_formats_minus1 may be in the range of 0 to X, inclusive. Video encoder 20 and video decoder 30 may code the set of bit depth and chroma format for the base layer by bit_depth_luma_minus8, bit_depth_chroma_minus8, and chroma_format_idc, and sets of bit depth and chroma format are signaled for enhancement layers by the following set of syntax elements bit_depth_luma_minus8[i], bit_depth_chroma_minus8[i], and chroma_format_idc[i].

Video encoder 20 and video decoder 30 may code the first set of representation format by bit_depth_luma_minus8, bit_depth_chroma_minus8, chroma_format_idc, pic_width_in_luma_samples, pic_height_in_luma_samples, pic_cropping_flag, pic_crop_left_offset, pic_crop_right_offset, pic_crop_top_offset, and pic_crop_bottom_offset.

In this example, bit_depth_luma_minus8[i], bit_depth_chroma_minus8[i], and chroma_format_idc[i] specify, respectively, the i-th set of bit_depth_luma_minus8, bit_depth_chroma_minus8, and chroma_format_idc_values in the coded video sequence.

In this example, pic_width_in_luma_samples[i] and pic_height_in_luma_samples[i] specify, respectively the width and height of each decoded picture in units of luma samples using the i-th representation format.

In this example, pic_cropping_flag[i] pic_crop_left_offset[i], pic_crop_right_offset[i], pic_crop_top_offset[i], and pic_crop_bottom_offset[i] specify, for the i-th set of representation format, the samples of the pictures in the coded video sequence that are output from the decoding process, in terms of a rectangular region specified in picture coordinates for output.

In this example, rep_format_idx[i] specifies the values index to the set of additional bit depth and chroma format that applies to the layer with layer_id equal to i. The values of bit_depth_luma_minus8, bit_depth_chroma_minus8, and chroma_format_idc for the layer with layer_id equal to i may be equal to bit_depth_luma_minus8[rep_format_idx[i]], bit_depth_chroma_minus8[rep_format_idx[i]], and chroma_format_idc[rep_format_idx[i]], respectively. The value of rep_format_idx[i] shall be in the range of 0 to X, inclusive.

In this example, dependency_id[i] specifies a dependency identifier for the layer with layer_id equal to i. dependency_id[i] may be in the range of 0 to X inclusive. When not present, dependency_id[i] may be inferred to be 0. When num_directly_dependent_layers[i] is greater than 0, dependency_id[i] may be equal to or greater than the dependency identifier of any layer the layer with layer_id equal to i depends on.

In this example, quality_id[i] specifies a equality identifier for the layer with layer_id equal to i. quality_id[i] may be in the range of 0 to X inclusive. When not present, quality_id[i] may be inferred to be 0. When num_directly_dependent_layers[i] is greater than 0, quality_id[i] may be equal to or greater than the quality identifier of any layer that the layer with layer_id equal to i depends on and that has dependency identifier equal to dependency_id[i].

In this example, num_short_term_ref_pic_sets specifies the number of short-term reference picture sets that are specified in the video parameter set. The value of num_short_term_ref_pic_sets may be in the range of 0 to 64, inclusive.

In this example, depth_included_flag equal to 1 indicates that the current 3DV operation point contains depth. In this example, depth_included_flag equal to 0 indicates that the current 3DV operation point does not contain depth.

Example syntax for the view dependency element of Table 5 are provided in Table 6 below:

TABLE 6

```
view_dependency( ) {
    num_views_minus1                               ue(v)
    for( i = 0; i <= num_views_minus1; i++ )
        view_id[ i ]                               ue(v)
    for( i = 1; i <= num_views_minus1; i++ ) {
        num_ref_views[ i ]
        for( j = 0; j < num_ref_views[ i ]; j++ )
            ref_view_idx[ i ][ j ]                 ue(v)
            inter_view_texture_flag[ i ][ j ]      u(1)
    }
}
```

Table 7 below defines an example set of data in which the view dependency of each non-base view is directly signaled in the sequence level.

TABLE 7

```
for( i = 1; i <= num_views_minus1; i++ ) {
    num_ref_views[ i ]                             ue(v)
    for( j = 0; j < num_ref_views[ i ]; j++ )
```

TABLE 7-continued

```
        ref_view_idx[ i ][ j ]                     ue(v)
}
```

In this example, num_ref_views[i] specifies the number of view components for inter-view prediction in the initial reference picture list RefPicList0 and RefPicList1 in decoding view components with view order index equal to i. In this example, the value of num_ref_views[i] is not greater than Min(15, num_views_minus1). In this example, the value of num_ref_views[0] is equal to 0.

In this example, ref_view_idx[i][j] specifies the view order index of the j-th view component for inter-view prediction in the initial reference picture list RefPicList0 and RefPicList1 in decoding a view component with view order index equal to i. In this example, the value of ref_view_idx[i][j] is in the range of 0 to 31, inclusive.

As noted above, a particular type of NAL unit (e.g., NAL unit type 10) may be used to encapsulate a video parameter set. The NAL unit syntax may be modified as shown in the example of Table 8 below.

TABLE 8

| nal_unit( NumBytesInNALunit ) { | Descriptor |
|---|---|
| forbidden_zero_bit | f(1) |
| nal_ref_flag | u(1) |
| nal_unit_type | u(6) |
| NumBytesInRBSP = 0 | |
| nalUnitHeaderBytes = 1 | |
| if( nal_unit_type != 10 ) { // not VPS NAL unit | |
|   if( cnt_p > 1 ) | |
|     priority_id | u(v) |
|   if( cnt_t > 1 ) | |
|     temporal_id | u(v) |
|   reserved_one_bit | u(1) |
|   if( cnt_d > 1 ) | |
|     dependency_id | u(v) |
|   if( cnt_q > 1 ) | |
|     quality_id | u(v) |
|   reserved_one_bit | u(1) |
|   if( cnt_v > 1 ) | |
|     view_idx | u(v) |
|   if( cnt_f ) | |
|     reserved_flags | u(v) |
|   m = Ceil( log2(cnt_p) )+ Ceil( log2(cnt_t) ) + Ceil( log2(cnt_d) ) + Ceil( log2(cnt_q) ) + Ceil( log2(cnt_v) ) + cnt_f + 2 | |
|   if( ( ( m + 7 >> 3 ) << 3 ) − m ) | |
|     reserved_bits | u(v) |
|   nalUnitHeaderBytes += ( ( m + 7 ) >> 3 ) | |
| } | |
| for( i = nalUnitHeaderBytes; i < NumBytesInNALunit; i++ ) { | |
|   if( i + 2 < NumBytesInNALunit && next_bits( 24 ) == 0x000003 ) { | |
|     rbsp_byte[ NumBytesInRBSP++ ] | b(8) |
|     rbsp_byte[ NumBytesInRBSP++ ] | b(8) |
|     i += 2 | |
|     emulation_prevention_three_byte /* equal to 0x03 */ | f(8) |
|   } else | |
|     rbsp_byte[ NumBytesInRBSP++ ] | b(8) |
| } | |
| } | |

In this example, elements within the "if(nal_unit_type!=10)" statement are added, relative to the conventional NAL unit syntax. In this example, the number of bits used to signal the syntax elements priority_id, temporal_id, dependency_id, quality_id and view_idx is Ceil(log 2(cnt_p)), Ceil(log 2(cnt_t)), Ceil(log 2(cnt_d)), Ceil(log 2(cnt_q)) and Ceil(log 2(cnt_v)), respectively. Likewise, in this example, when any of the syntax elements priority_id, temporal_id, dependency_id, quality_id and view_idx is not present, the value of that syntax element is inferred to be equal to 0.

Except as defined above with respect to the number of bits and the inferences that may be drawn, semantics for the syntax elements of Table 8 may be defined as follows. The semantics of priority_id, dependency_id, and quality_id may be as defined in the SVC extension of ITU-T H.264/AVC. The semantics of temporal_id may be as defined in WD4 of HEVC. In this example, reserved_one_bit is equal to 1. The value 0 for reserved_one_bit may be specified by future extensions of the HEVC standard. Decoders, such as video decoder 30, may be configured to ignore the value of reserved_one_bit.

In this example, view_idx specifies the view order index for a view. The semantics of view_idx may be the same as the syntax element "view order index" as specified in the MVC extension of ITU-T H.264/AVC.

In this example, each bit of reserved_flags is equal to 1. Other values for reserved_flags may be specified by future extensions of the upcoming HEVC standard. Decoders, such as video decoder 30, may be configured to ignore the value of reserved_flags, unless configured to operate in accordance with an extension that assigns semantics to bits of reserved_flags. In this example, the number of bits used to represent reserved_flags is reserved_flags_len.

In this example, each bit of reserved_bits is equal to 1. Other values for reserved_bits may be specified by future extension of the upcoming HEVC standard. Decoders, such as video decoder 30, may be configured to ignore the value of reserved_bits, again unless configured in accordance with such a future extension. The number of bits used to represent reserved_bits, in this example, is $((m+7>>3)<<3)-m$.

Table 9 below provides example syntax for a layer parameter set. The same syntax may be used for each of the LPSs of FIG. 5, in some examples.

TABLE 9

| layer_para_set( ) { | Descriptor |
|---|---|
| depth_flag | u(1) |
| layer_para_set_id | ue(v) |
| vps_id | ue(v) |
| // cu hierarchy {{ | |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| // cu hierarchy }} | |
| pcm_bit_depth_luma_minus1 | u(4) |
| pcm_bit_depth_chroma_minus1 | u(4) |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| //tiles | |
| num_tile_columns_minus1 | ue(v) |
| num_tile_rows_minus1 | ue(v) |
| if (num_tile_columns_minus1 != 0 \|\| | |
| num_tile_rows_minus1 != 0) { | |

TABLE 9-continued

| layer_para_set( ) { | Descriptor |
|---|---|
| tile_boundary_independence_idc | u(1) |
| uniform_spacing_idc | u(1) |
| if (uniform_spacing_idc != 1) { | |
| for (i=0; i<num_tile_columns_minus1 ; i++) | |
| column_width[i] | ue(v) |
| for (i=0; i <num_tile_rows_minus1; i++) | |
| row_height[i] | ue(v) |
| } | |
| } | |
| lps_extension_flag | u(1) |
| if( lps_extension_flag ) | |
| while( more_rbsp_data( ) ) | |
| lps_extension_data_flag | u(1) |
| rbsp_trailing_bits( ) | |
| } | |

Examples of the semantics for the LPS syntax of Table 9 are described below. Different layers (e.g., different views in MVC or different layers in SVC) may refer to different LPSs. Different quality layers in a same dependency layer may share the same LPS. Different temporal layers in a same dependency layer may share the same LPS. Alternatively, different views may refer to a same LPS, and different dependency layers may refer to a same LPS.

In this example, depth_flag equal to 1 specifies that the LPS applies to the depth representations identified by the values of temporal_id, dependency_id, quality_id and view_idx of the LPS NAL unit. Depth_flag equal to 0 specifies that the LPS applies to the texture representations identified by the values of temporal_id, dependency_id, quality_id and view_idx of the LPS NAL unit.

In this example, layer_para_set_id specifies the id of the current layer parameter set (LPS). Different layer parameter sets with the same values of dependency_id and view_idx, respectively, share one value space for layer_para_set_id, meaning that different LPSs with different combination of depencey_id and view_idx may have the same value of layer_para_set_id.

Alternatively, all LPSs may share the one value space, meaning that each LPS has a distinct value of layer_para_set_id.

In this example, vps_id identifies the video parameter set to which this layer parameter set refers.

In this example, lps_extension_flag equal to 0 specifies that no lps_extension_data_flag syntax elements are present in the layer parameter set RBSP syntax structure. In this example, lps_extension_flag may be equal to 0 in bitstreams conforming to the upcoming HEVC standard. The value of 1 for lps_extension_flag is reserved for future use by ITU-T|ISO/IEC. Decoders, such as video decoder 30, may ignore all data that follow the value 1 for lps_extension_flag in a layer parameter set NAL unit.

In this example, lps_extension_data_flag may have any value, and does not affect the conformance to profiles specified in the upcoming HEVC standard.

Other syntax elements may have the same semantics as the syntax elements with the same names in the SPS of the HEVC WD, but applying only to pictures referring to this LPS.

An LPS may be contained in a NAL unit, the header of which may be defined according to Table 8 above. The following syntax elements have the following slightly modified semantics when they are associated with an LPS.

In this example, priority_id is equal to the minimum value of the priority_id values of all the NAL units referring to this LPS.

In this example, temporal_id is equal to the minimum value of the temporal_id of all the NAL units referring to this LPS.

In this example, dependency_id is equal to the dependency_id of all the NAL units referring to this LPS.

In this example, quality_id is equal to the minimum value of quality_id of all the NAL units referring to this LPS.

In this example, v_idx is the view index of the current LPS. All pictures referring to this LPS may have a view id of view_id[v_idx].

Alternatively, the above syntax elements may be directly signaled in the layer parameter set syntax table, as shown in the example of Table 10. More detailed syntax table can be designed according to Table 9 below. In this case, those syntax elements are not in the NAL unit header of the LPS and the parsing of the LPS may be dependent on the VPS with an ID equal to vps_id.

TABLE 10

| layer_para_set( ) { | Descriptor |
|---|---|
| vps_id | u(8) |
| if( cnt_p > 1 ) | |
|   priority_id | u(v) |
| if( cnt_t > 1 ) | |
|   temporal_id | u(v) |
| reserved_one_bit | u(1) |
| if( cnt_d > 1 ) | |
|   dependency_id | u(v) |
| if( cnt_q > 1 ) | |
|   quality_id | u(v) |
| if( cnt_v > 1 ) | |
|   view_idx | u(v) |
| depth_flag | u(1) |
| layer_para_set_id | ue(v) |
| // cu hierarchy {{ | |
| ... | |
|   rbsp_trailing_bits( ) | |
| } | |

An LPS in this case, does not need to have a NAL unit header duplicating the above syntax elements. Assuming the NAL unit type of a NAL unit encapsulating an LPS is, e.g., 5, the NAL unit header syntax may be slightly modified as shown in Table 11, which adds the exception "&& nal_unit_type!=5" in the "if" statement of Table 8:

TABLE 11

| nal_unit( NumBytesInNALunit ) { | Descriptor |
|---|---|
| forbidden_zero_bit | f(1) |
| nal_ref_flag | u(1) |
| nal_unit_type | u(6) |
| NumBytesInRBSP = 0 | |
| nalUnitHeaderBytes = 1 | |
| if( nal_unit_type != 10 && nal_unit_type !=5 ) | |
| { // not VPS NAL unit | |
|   if( cnt_p > 1 ) | |
|     priority_id | u(v) |
|   if( cnt_t > 1 ) | |
|     temporal_id | u(v) |
|     reserved_one_bit | u(1) |
|   if( cnt_d > 1 ) | |
|     dependency_id | u(v) |
|   if( cnt_q > 1 ) | |
|     quality_id | u(v) |
|     reserved_one_bit | u(1) |
|   if( cnt_v > 1 ) | |
|     view_idx | u(v) |
|   if( cnt_f ) | |
|     reserved_flags | u(v) |
| m = Ceil( log2(cnt_p) )+ Ceil( log2(cnt_t) ) + Ceil( log2(cnt_d) ) + Ceil( log2(cnt_q) ) + Ceil( log2(cnt_v) ) + cnt_f + 2 | |
| if( ( ( m + 7 >> 3) << 3 ) – m) | |
|   reserved_bits | u(v) |
| nalUnitHeaderBytes += ( ( m + 7 ) >> 3 ) | |
| } | |
| for( i = nalUnitHeaderBytes; i < NumBytesInNALunit; i++ ) { | |
|   if( i + 2 < NumBytesInNALunit && next_bits( 24 ) = = 0x000003) { | |
|     rbsp_byte[ NumBytesInRBSP++ ] | b(8) |
|     rbsp_byte[ NumBytesInRBSP++ ] | b(8) |
|     i += 2 | |
|     emulation_prevention_three_byte /* equal to 0x03 */ | f(8) |
|   } else | |
|     rbsp_byte[ NumBytesInRBSP++ ] | b(8) |
| } | |
| } | |

In other examples, video encoder 20 and video decoder 30 may code the scalable characteristics related syntax elements using fixed length coding, as shown in the example of Table 12 below.

TABLE 12

| layer_para_set( ) { | Descriptor |
|---|---|
| vps_id | u(8) |
| priority_id | u(5) |
| temporal_id | u(3) |
| dependency_id | u(3) |
| quality_id | u(3) |
| view_idx | u(8) |
| layer_para_set_id | ue(v) |
| // cu hierarchy {{ | |

Table 13 below provides an example of syntax for a picture parameter set (PPS) in accordance with the techniques of this disclosure. In this example, the picture parameter set need not signal a "seq_parameter_set_id," contrary to the PPS of conventional HEVC.

TABLE 13

| pic_parameter_set_rbsp( ) { | Descriptor |
|---|---|
| pic_parameter_set_id | ue(v) |
| ... | |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

Examples of the semantics for the PPS of Table 13 are described below.

In this example, pps_extension_flag equal to 0 specifies that no pps_extension_data_flag syntax elements are present in the picture parameter set RBSP syntax structure. In this example, pps_extension_flag is equal to 0 in bitstreams conforming to the upcoming HEVC standard. The value of 1 for pps_extension_flag may be reserved for future use by ITU-T|ISO/IEC. Decoders, such as video decoder 30, may ignore all data that follow the value 1 for pps_extension_flag in a picture parameter set NAL unit.

In this example, pps_extension_data_flag may have any value. It does not necessarily affect the conformance to profiles specified in the upcoming HEVC standard. Semantics for values of pps_extension_data_flag may be assigned in further developments of the HEVC standard or extensions of the standard without conflicting with the techniques of this disclosure.

In the techniques of this disclosure, no sequence parameter set id or layer parameter set id needs to be signaled in the PPS. Some other syntax elements in PPS may be moved to LPS. That is, video encoder 20 and/or video decoder 30 may be configured to code one or more LPSs including data similar to the syntax elements shown in Table 13.

Figure 6:
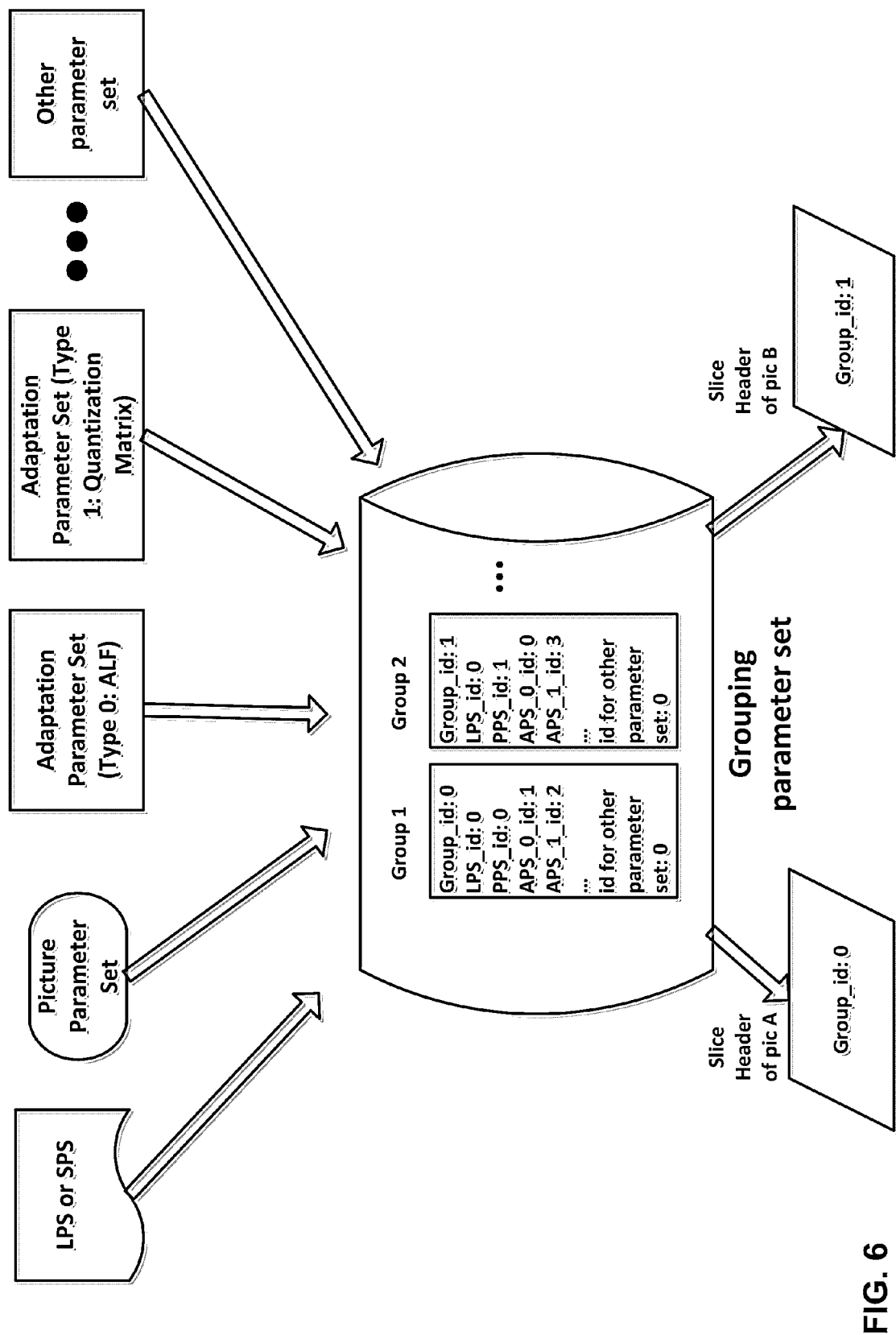
FIG. 6 is a conceptual diagram illustrating an example grouping parameter set (GPS) and relationships of the GPS with other parameter sets and slice headers.

FIG. 6 is a conceptual diagram illustrating an example grouping parameter set (GPS) and relationships of the GPS with other parameter sets and slice headers. In this example, the other parameter sets include LPSs, SPSs, PPSs, adaptation parameter sets (APSs) of type 0 (e.g., APSs signaling adaptive loop filter (ALF) parameters), APSs of type 1 (e.g., APSs signaling a quantization matrix), and other parameter sets. In this example, the GPS includes a plurality of different groups, each having a unique GPS ID (also referred to as a group ID), where each group indicates a particular one of each of the various parameter sets by parameter set ID. In this manner, slice headers need only specify a group_id to specify each of the parameter sets corresponding to the group having that group_id.

Tables 14 and 15 below provide alternative examples of syntax for a grouping parameter set RBSP.

TABLE 14

| group_para_set_rbsp( ) { | Descriptor |
|---|---|
| number_signaled_para_set_groups_minus1 | ue(v) |
| for( i = 0; i<= number_signaled_para_set_groups_minus1; i++ ) { | |
|   para_set_group_id[ i ] | ue(v) |
|   lps_id[ i ] | ue(v) |
|   pps_id[ i ] | ue(v) |
|   for (j= 0; j< numParaSetTypes; j++) | |
|     para_set_type_id[ i ][ j ] | |
| } | |
| gps_extension_flag | u(1) |
| if( gps_extension_flag ) | |
|   while( more_rbsp_data( ) ) | |
|     gps_extension_data_flag | u(1) |
| rbsp_trailing_bits( ) | |
| } | |

TABLE 15

| group_para_set_rbsp( ) { | Descriptor |
|---|---|
| number_signaled_para_set_groups_minus1 | ue(v) |
| for( i = 0; i<= number_signaled_para_set_groups_minus1; i++ ) { | |
|   para_set_group_id[ i ] | ue(v) |
|   lps_id[ i ] | ue(v) |
|   pps_id[ i ] | ue(v) |
|   aps_id[ i ] | ue(v) |
| } | |
| gps_extension_flag | u(1) |
| if( gps_extension_flag ) | |
|   while( more_rbsp_data( ) ) | |
|     gps_extension_data_flag | u(1) |
| rbsp_trailing_bits( ) | |
| } | |

Video coders, such as video encoder 20 and video decoder 30, may be configured to code a grouping parameter set in accordance with, e.g., Table 14 or Table 15. Examples of semantics for the syntax of the grouping parameter sets are provided below.

In this example, number_signalled_para_set_groups_minus1 plus 1 specifies the number of parameter groups signaled. This value may be in the range of 0 to 30, inclusive.

In this example, para_set_group_id[i] specifies the ID of the i-th signalled parameter set group. The value of para_set_group_id[i] shall be in the range of 0 to 31, inclusive.

In this example, para_set_type_id[i][j] specifies the ID of the j-th parameter set type for the i-th parameter set group.

In this example, lps_id[i] indicates the id of the layer parameter set referred by the parameter set group with a group id of para_set_group_id[i]. The values of dependency_id and view_idx of an LPS with layer_para_set_id equal to lps_id[i] may be identical to the values of dependency_id and view_idx, respectively, of the parameter set group NAL unit.

The values of dependency_id and view_idx of a parameter set grouping RBSP are present in the NAL unit header of this RBSP in the examples of Tables 14 and 15, and the values of dependency_id and view_idx of an LPS may be present either in the NAL unit header of this LPS or in the syntax table of the LPS.

Alternatively, the values of dependency_id and view_idx of an LPS with layer_para_set_id equal to lps_id[i] may not be identical to the values of dependency_id and view_, respectively, of the parameter set group NAL unit.

In this example, pps_id[i] indicates the id of the picture parameter set referred by the parameter set group with a group id of para_set_group_id[i].

In this example, aps_id[i] indicates the id of the adaptation parameter set referred by the parameter set group with a group id of para_set_group_id[i].

In this example, gps_extension_flag equal to 0 specifies that no gps_extension_data_flag syntax elements are present in the parameter set grouping RBSP syntax structure. Gps_extension_flag may be equal to 0 in bitstreams conforming to the upcoming HEVC standard. The value of 1 for gps_extension_flag may be reserved for future use by ITU-T|ISO/IEC. Decoders, such as video decoder 30, may ignore all data that follow the value 1 for gps_extension_flag in a parameter set grouping NAL unit. In general, gps_extension_data_flag may have any value. It need not affect the conformance to profiles specified in the upcoming HEVC standard.

In some examples, para_set_type_id[i][j] may instead be aps_id[i][j], with similar semantics as aps_id[i] as described above.

As shown in FIG. 6, instead of referring to the picture parameter set ID in the slice header, in accordance with the techniques of this disclosure, the slice header may refer to a parameter set group ID, thus indirectly referring to an LPS, a PPS and an APS of each type (e.g., APSs providing ALF parameters and quantization matrices).

A video coder may activate a video parameter set or a layer parameter sets when a VCL NAL unit (containing a coded slice) refers to the parameter set, indirectly, e.g., based on the H.264/AVC design principal.

In some examples, parameter sets can be activated by a specific type of NAL unit, rather than by a coded slice. For example, a NAL unit type of this specific type (parameter sets activation NAL unit), if present in the bitstream, may activate one, and exactly one, VPS. In various alternatives, in addition, such a type of a NAL unit may activate at least one LPS. In addition, such type of NAL unit may activate at least one PPS. In addition, such type of NAL unit may activate at least one APS. A parameter sets activation NAL unit can be a grouping parameter set RBSP. A parameter sets activation (PSA) NAL unit may be applicable to one coded video sequence. A PSA NAL unit may be considered a non-VCL NAL unit, that is, not directly relevant to a video coder. The NAL unit header syntax of the PSA NAL unit may be the same as a VPS NAL unit.

In some examples, a PSA NAL unit, if present in an access unit, may precede the first VCL NAL unit of the access unit. There may be at least one PSA NAL unit in the first access unit of a coded video sequence, e.g., an IDR picture. Multiple PSA NAL units in the same coded video sequence may contain the same VPS id; thus, no different video parameter sets need to be activated within the same coded video sequence. A PSA NAL unit, if present in an access unit, may precede any LPS, PPS, APS, or SEI NAL unit, if present. A VPS NAL unit, if present in an access unit, may precede any LPS, PPS, APS, or SEI NAL unit, if present. In various alternatives, in addition, a PSA NAL unit, if present in an access unit, may precede a VPS NAL unit, if present.

In some examples, video coders, such as video encoder 20 and video decoder 30, may be configured to utilize the syntax of Table 16 for a sequence parameter set (SPS), as opposed to the conventional SPS syntax of, e.g., HEVC.

TABLE 16

| seq_parameter_set_rbsp( ) { | Descriptor |
|---|---|
| video_parameter_set_id | ue(v) |
| rep_format_idx | ue(v) |
| pcm_enabled_flag | u(1) |
| if( pcm_enabled_flag ) { | |
|   pcm_bit_depth_luma_minus1 | u(4) |
|   pcm_bit_depth_chroma_minus1 | u(4) |
| } | |
| qpprime_y_zero_transquant_bypass_flag | u(1) |
| log2_max_pic_order_cnt_lsb_minus4 | ue(v) |
| for( i = 0; i <= max_temporal_layers_minus1; i++ ) { | |
|   max_dec_pic_buffering[ i ] | ue(v) |
|   num_reorder_pics[ i ] | ue(v) |
|   max_latency_increase[ i ] | ue(v) |
| } | |
| restricted_ref_pic_lists_flag | u(1) |
| if( restricted_ref_pic_lists_flag ) | |
|   lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
|   log2_min_pcm_coding_block_size_minus3 | ue(v) |
|   log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | |
| chroma_pred_from_luma_enabled_flag | u(1) |
| deblocking_filter_in_aps_enabled_flag | u(1) |
| seq_loop_filter_across_slices_enabled_flag | u(1) |
| asymmetric_motion_partitions_enabled_flag | u(1) |
| non_square_quadtree_enabled_flag | u(1) |
| sample_adaptive_offset_enabled_flag | u(1) |
| adaptive_loop_filter_enabled_flag | u(1) |
| if( adaptive_loop_filter_enabled_flag ) | |
|   alf_coef_in_slice_flag | u(1) |
| if( pcm_enabled_flag ) | |
|   pcm_loop_filter_disable_flag | u(1) |
| temporal_id_nesting_flag | u(1) |
| if( log2_min_coding_block_size_minus3 = = 0 ) | |
|   inter_4x4_enabled_flag | u(1) |
| long_term_ref_pics_present_flag | u(1) |
| tiles_or_entropy_coding_sync_idc | u(2) |
| if( tiles_or_entropy_coding_sync_idc = = 1 ) { | |

TABLE 16-continued

| seq_parameter_set_rbsp( ) { | Descriptor |
|---|---|
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width[ i ] | ue(v) |
|     for( i = 0; i < num_tile_rows_minus1; i++ ) | |
|       row_height[ i ] | ue(v) |
|   } | |
|   loop_filter_across_tiles_enabled_flag | u(1) |
| } | |
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

The example SPS of Table 16 eliminates profile_idc, reserved_zero_8 bits, level_idc, chroma_format_idc, separate_colour_plane_flag and corresponding conditional "if," max_temporal_layers_minus1, pic_width_in_luma_samples, pic_height_in_luma_samples, pic_cropping_flag, pic_crop_left_offset, pic_crop_right_offset, pic_crop_top_offset, and pic_crop_bottom_offset and corresponding conditional "if" statement, bit_depth_luma_minus8, bit_depth_chroma_minus8, num_short_term_ref_pic_sets, and short_term_ref_pic_set(i) and corresponding conditional "if" statement from the conventional SPS syntax. Moreover, the example SPS of Table 16 adds a video_parameter_set_id and rep_format_idx. The semantics for the other remaining syntax elements may be the same as defined in conventional HEVC. The semantics for the added elements video_parameter_set_id and rep_format_idx may be defined as follows:

In this example, video_parameter_set_id identifies the video parameter set (VPS) referred by the current SPS. Alternatively, video_parameter_set_id need not signaled, and a GPS may be used to link an SPS to a specific VPS.

In this example, rep_format_idx specifies the index to the representation format signaled in the referred video parameter set.

As yet another alternative, Table 17 provides another example of syntax for a grouping parameter set. It is assumed that, in this example, the video parameter set ID syntax element is not present in the SPS syntax, as described above.

TABLE 17

| group_para_set_rbsp( ) { | Descriptor |
|---|---|
| gps_id | ue(v) |
| vps_id | ue(v) |
| sps_id | ue(v) |
| pps_id | ue(v) |
| num_ref_aps_ids | ue(v) |
| for( i = 0; i < num_ref_aps_ids; i++ ) { | |
|   ref_aps_id[ i ] | ue(v) |
|   ref_aps_param_type[ i ] | ue(v) |
| } | |
| gps_extension_flag | |
| if( gps_extension_flag ) | |
|   while( more_rbsp_data( ) ) | |
|     gps_extension_data_flag | u(1) |
| rbsp_trailing_bits( ) | |
| } | |

The semantics for the syntax elements of Table 17 may be defined as follows:

In this example, gps_id specifies the identifier of a group parameter set (GPS).

In this example, vps_id specifies the identifier of the video parameter set referred to by the GPS.

In this example, sps_id specifies the identifier of the sequence parameter set referred to by the GPS.

In this example, pps_id specifies the identifier of the picture sequence parameter set referred to by the GPS.

In this example, num_ref_aps_ids specifies the number of the following ref_aps_id[i] syntax elements. The value of num_ref_aps_ids shall be in the range of 0 to 4, inclusive.

In this example, ref_aps_id[i] identifies the i-th adaptation parameter set referenced by the group parameter set.

The same value of the ref_aps_id[i] may be present in the loop more than once, and thus, more than one type of APS parameters from the same APS can be referenced by the same GPS and may apply to coded slices referring to the GPS.

In this example, ref_aps_param_type[i] specifies the type of the APS parameters included in the i-th adaption parameter set referenced by the group parameter set. The value of ref_aps_parame_type[i] may be in the range of 0 to 3, inclusive. The values of 0 to 3, inclusive, for ref_aps_parame_type[i] correspond to the APS parameter types of scaling list, deblocking filter, sample adaptive offset (SAO), and ALF, respectively. The values of ref_aps_parame_type[i] for any two different values of i shall not be identical, in some examples.

In this example, gps_extension_flag equal to 0 specifies that no gps_extension_data_flag syntax elements are present in the parameter set grouping RBSP syntax structure. gps_extension_flag may be equal to 0 in bitstreams conforming to the upcoming HEVC standard. The value of 1 for gps_extension_flag may be reserved for future use by ITU-T|ISO/IEC. Decoders, such as video decoder 30, may ignore all data that follow the value 1 for gps_extension_flag in a parameter set grouping NAL unit.

In this example, gps_extension_data_flag may have any value. It need not affect the conformance to profiles specified in the upcoming HEVC standard.

Video coders, such as video encoder 20 and video decoder 30, may apply the following process to activate parameter sets for single-layer or single-view bitstreams, when the GPS is specified according to Table 17, or substantially conforms to the example of Table 17.

An adaptation parameter set RBSP may include parameters that can be referred to by the coded slice NAL units of one or more coded pictures indirectly through one or more group parameter sets referred to by the coded slice NAL units. Each adaptation parameter set RBSP may be initially considered not active at the start of the operation of the decoding process. At most one adaptation parameter set RBSP may be considered active for each type of APS parameters at any given moment during the operation of the decoding process, and the activation of any particular adaptation parameter set RBSP for a particular type of APS parameters results in the deactivation of the previously-active adaptation parameter set RBSP (if any) for that particular type of APS parameters.

When an adaptation parameter set RBSP (with a particular value of aps_id) is not active for a particular type of APS parameters and it is referred to by a coded slice NAL unit for that particular type of APS parameters (using that value of aps_id) indirectly through a group parameter set referred to by the coded slice NAL unit, it may be activated for that particular type of APS parameters. This adaptation parameter set RBSP is called the active adaptation parameter set RBSP for that particular type of APS parameters until it is deactivated by the activation of another adaptation parameter set RBSP for that particular type of APS parameters. An adaptation parameter set RBSP, with that particular value of aps_id, may be available to the decoding process prior to its activation.

A picture parameter set RBSP may include parameters that can be referred to by the coded slice NAL units of one or more coded pictures indirectly through one or more group parameter sets referred to by the coded slice NAL units. Each picture parameter set RBSP may be initially considered not active at the start of the operation of the decoding process. At most one picture parameter set RBSP may be considered active at any given moment during the operation of the decoding process, and the activation of any particular picture parameter set RBSP results in the deactivation of the previously-active picture parameter set RBSP (if any).

When a picture parameter set RBSP (with a particular value of pic_parameter_set_id) is not active and it is referred to by a coded slice NAL unit (using that value of pic_parameter_set_id) indirectly through a group parameter set referred to by the coded slice NAL unit, it may be activated. This picture parameter set RBSP is called the active picture parameter set RBSP until it is deactivated by the activation of another picture parameter set RBSP. A picture parameter set RBSP, with that particular value of pic_parameter_set_id, may be available to the decoding process prior to its activation.

Any picture parameter set NAL unit containing the value of pic_parameter_set_id for the active picture parameter set RBSP for a coded picture may have the same content as that of the active picture parameter set RBSP for the coded picture unless it follows the last VCL NAL unit of the coded picture and precedes the first VCL NAL unit of another coded picture.

A sequence parameter set RBSP may include parameters that can be referred to by the coded slice NAL units of one or more coded pictures indirectly through one or more group parameter sets referred to by the coded slice NAL units, or can be referred to by one or more SEI NAL units containing a buffering period SEI message. Each sequence parameter set RBSP may be initially considered not active at the start of the operation of the decoding process. At most one sequence parameter set RBSP may be considered active at any given moment during the operation of the decoding process, and the activation of any particular sequence parameter set RBSP results in the deactivation of the previously-active sequence parameter set RBSP (if any).

When a sequence parameter set RBSP (with a particular value of seq_parameter_set_id) is not already active and it is referred to by a coded slice NAL unit indirectly through a group parameter set referred to by the coded slice NAL unit (using that value of seq_parameter_set_id) or is referred to by an SEI NAL unit containing a buffering period SEI message (using that value of seq_parameter_set_id), it may be activated. This sequence parameter set RBSP is called the active sequence parameter set RBSP until it is deactivated by the activation of another sequence parameter set RBSP. A sequence parameter set RBSP, with that particular value of seq_parameter_set_id and contained within an access unit with temporal_id equal to 0, may be available to the decoding process prior to its activation. An activated sequence parameter set RBSP shall remain active for the entire coded video sequence.

A video parameter set RBSP may include parameters that can be referred to by the coded slice NAL units of one or more coded pictures indirectly through one or more group parameter sets referred to by the coded slice NAL units, or can be referred to by one or more SEI NAL units containing a buffering period SEI message. Each video parameter set RBSP may be initially considered not active at the start of the operation of the decoding process. At most one video parameter set RBSP may be considered active at any given moment during the operation of the decoding process, and the activation of any particular video parameter set RBSP results in the deactivation of the previously-active video parameter set RBSP (if any).

When a video parameter set RBSP (with a particular value of video_parameter_set_id) is not already active and it is referred to by a coded slice NAL unit indirectly through a group parameter set referred to by the coded slice NAL unit (using that value of video_parameter_set_id) or is referred to by an SEI NAL unit containing a buffering period SEI message (using that value of video_parameter_set_id), it may be activated. This video parameter set RBSP is called the active video parameter set RBSP until it is deactivated by the activation of another video parameter set RBSP. A video parameter set RBSP, with that particular value of video_parameter_set_id and contained within an access unit with temporal_id equal to 0, shall be available to the decoding process prior to its activation. An activated video parameter set RBSP shall remain active for the entire coded video sequence.

Any sequence parameter set NAL unit containing the value of seq_parameter_set_id for the active sequence parameter set RBSP for a coded video sequence may have the same content as that of the active sequence parameter set RBSP for the coded video sequence unless it follows the last access unit of the coded video sequence and precedes the first VCL NAL unit and the first SEI NAL unit containing a buffering period SEI message (when present) of another coded video sequence.

Any video parameter set NAL unit containing the value of video_parameter_set_id for the active video parameter set RBSP for a coded video sequence may have the same content as that of the active video parameter set RBSP for the coded video sequence unless it follows the last access unit of the coded video sequence and may precede the first VCL NAL unit and the first SEI NAL unit containing a buffering period SEI message (when present) of another coded video sequence.

All constraints that are expressed on the relationship between the values of the syntax elements (and the values of variables derived from those syntax elements) in video parameter sets, sequence parameter sets, picture parameter sets and adaptation parameter sets and other syntax elements are expressions of constraints that may apply only to the active video parameter sets, the active sequence parameter set, the active picture parameter set and the active adaptation parameter set for each particular type of APS parameters. If any video parameter set RBSP is present that is not activated in the bitstream, its syntax elements may have values that would conform to the specified constraints if it were activated by reference in an otherwise-conforming bitstream. If any sequence parameter set RBSP is present that is not activated in the bitstream, its syntax elements may have values that would conform to the specified constraints if it were activated by reference in an otherwise-conforming bitstream. If any picture parameter set RBSP is present that is not ever activated in the bitstream, its syntax elements may have values that would conform to the specified constraints if it were activated by reference in an otherwise-conforming bitstream. If any adaptation parameter set RBSP is present that is not ever activated in the bitstream, its syntax elements may have values that would conform to the specified constraints if it were activated by reference in an otherwise-conforming bitstream.

During operation of the decoding process, the values of parameters of the active video parameter set, the active sequence parameter set, the active picture parameter set and the active adaptation parameter set for each type of APS parameters may be considered in effect. For interpretation of SEI messages, the values of the parameters of the video parameter set, sequence parameter set, picture parameter set and adaptation parameter set that are active for the operation of the decoding process for the VCL NAL units of the coded picture in the same access unit may be considered in effect unless otherwise specified in the SEI message semantics.

Figure 7:
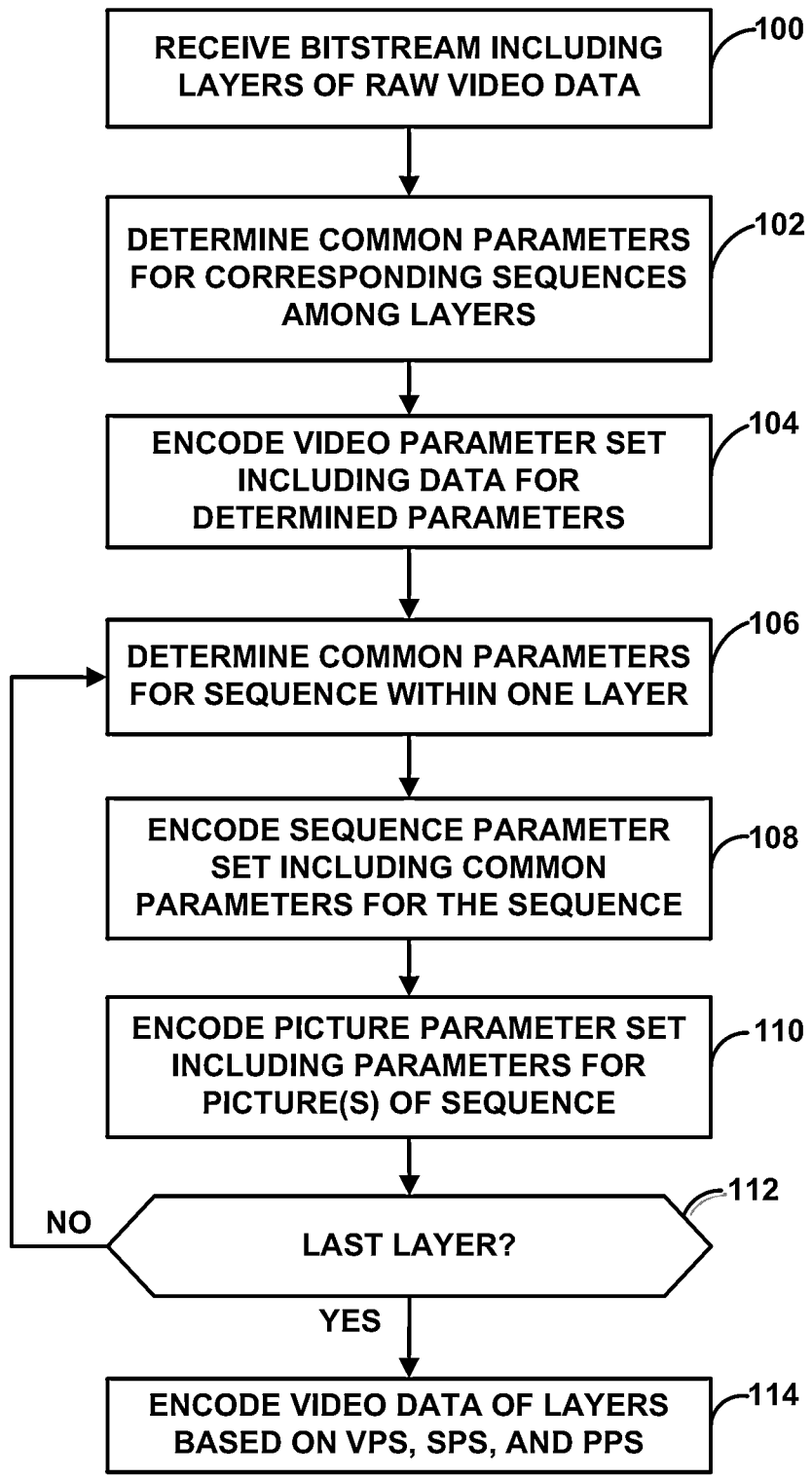
FIG. 7 is a flowchart illustrating an example method for encoding video data in accordance with the techniques of this disclosure.

FIG. 7 is a flowchart illustrating an example method for encoding video data in accordance with the techniques of this disclosure. Although described with respect to video encoder 20, it should be understood that other video encoding devices may be configured to perform the method of FIG. 7.

Initially, in this example, video encoder 20 receives a bitstream including a one or more layers of raw video data (100). For example, video source 18 (FIG. 1) may provide multi-view video data to video encoder 20. Alternatively, video encoder 20, or a preprocessor thereof, may divide a raw video bitstream into a plurality of various layers, e.g., spatial resolution layers, quality layers, temporal layers, or the like. In still other examples, a bitstream may be partitioned into a combination of various layers, e.g., any combination of views, spatial resolution layers, quality layers, temporal layers, or the like.

Video encoder 20 may determine one or more common parameters for corresponding sequences among a set of layers (102). Corresponding sequences may be sequences having corresponding temporal locations in different layers. That is, a first sequence, having a starting time (in terms of display time) of T1 and an ending time (again in terms of display time) of T2, and a second sequence, also having a starting time of T1 and an ending time of T2, may be said to correspond to one another. In particular, the first sequence may form part of a first layer, and the second sequence may form part of a second, different layer. A "sequence" may include a series of consecutive pictures in decoding order, e.g., starting with an instantaneous decoding refresh (IDR) picture and ending immediately prior to a subsequent IDR picture in decoding order. In general, the parameters may correspond to a set of corresponding sequences of one or more layers, e.g., N layers, where N is an integer. Video encoder 20 may then encode a VPS including data for the determined parameters (104). For example, video encoder 20 may code a VPS corresponding to one of the examples of Table 2 or Table 5.

Video encoder 20 may also determine common parameters for a sequence within one layer (106). The sequence may comprise one of the sequences corresponding to other sequences in other layers for which the VPS was coded. Video encoder 20 may code a sequence parameter set (SPS) including the common parameters for the sequence (108). Thus, it should be understood that the VPS and the SPS are separate data structures and corresponding to different types of video data. Whereas a VPS may correspond to a set of corresponding sequences among a plurality of layers, the SPS corresponds to one sequence in one layer. The SPS may conform substantially to an SPS of H.264/AVC, the SPS of H.264/AVC as extended by MVC (illustrated in Table 1 above), the upcoming HEVC standard, or the example of Table 16 described above. In addition, video encoder 20 may code a picture parameter set (PPS) for a picture in the sequence (110). The PPS may conform substantially to an SPS of H.264/AVC, the upcoming HEVC standard, or the example of Table 13 described above. Although the method of FIG. 7 shows coding of only one PPS, it should be understood that multiple PPSs may be coded. One or more pictures may refer to the same PPS.

Video encoder 20 may then determine whether the recent layer for which an SPS and PPSs were coded is the last layer (112). If the last layer has not yet been addressed ("NO" branch of 112), video encoder 20 may select a next layer and code an SPS and one or more PPSs for the next layer, e.g., in accordance with steps 106-110. After the last layer has been addressed ("YES" branch of 112), video encoder 20 may encode video data of the various layers based on the data of the VPS, SPS, and PPS. Various examples of coding video data based at least in part on a VPS are described in greater detail below with respect to FIGS. 9-12.

Although not shown in the example of FIG. 7, in some examples, video encoder 20 may additionally encode one or more LPSs and/or one or more GPSs, as described above. The LPSs may conform substantially to the examples of Table 9, Table 10, or Table 12, while the GPS may conform substantially to the examples of Table 14, Table 15, or Table 17. In such examples, video encoder 20 codes the video data also based at least in part on the LPSs and/or the GPSs.

In this manner, the method of FIG. 7 represents an example of a method including coding a video parameter set (VPS) for one or more layers of video data, wherein each of the one or more layers of video data refer to the VPS, and coding the one or more layers of video data based at least in part on the VPS.

Figure 8:
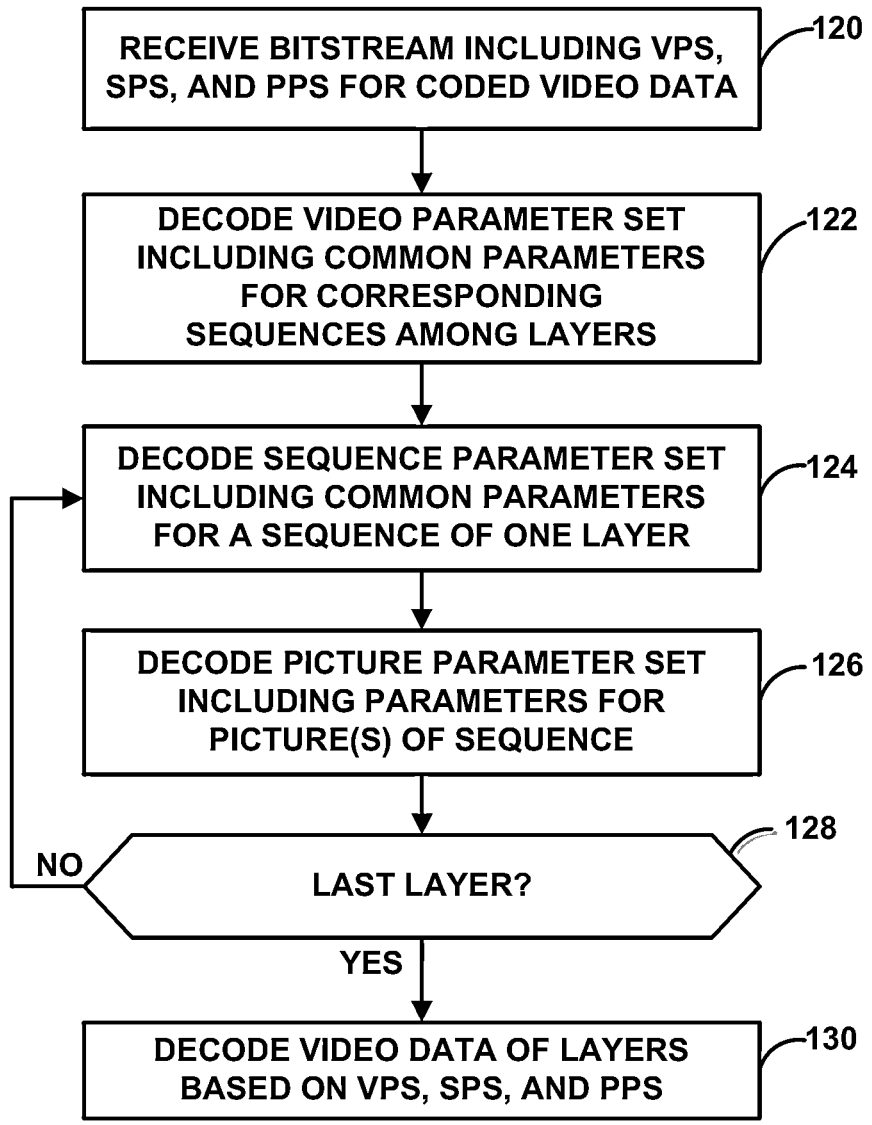
FIG. 8 is a flowchart illustrating an example method for decoding video data in accordance with the techniques of this disclosure.

FIG. 8 is a flowchart illustrating an example method for decoding video data in accordance with the techniques of this disclosure. Although described with respect to video decoder 30, it should be understood that other video decoding devices may be configured to perform the method of FIG. 8.

Initially, video decoder 30 receives a bitstream including a VPS, one or more SPSs, and one or more PPSs for layers of coded video data (120). Video decoder 30 may then decode the VPS, which includes common parameters for corresponding sequences among one or more layers (122). Likewise, video decoder 30 may decode a sequence parameter set including common parameters for a sequence of one layer (124). Moreover, video decoder 30 may decode a picture parameter set including parameters for a picture of the sequence (126). As discussed above, one or more pictures may refer to the same PPS, and therefore, the parameters of the PPS may be considered common to one or more pictures. Likewise, video decoder 30 may decode a plurality of PPSs for the sequence, although not shown in FIG. 8.

Furthermore, video decoder 30 may determine whether the most recent layer was the last layer to be addressed (128). If the most recent layer was not the last layer ("NO" branch of 128), video decoder 30 may proceed to decode an SPS and one or more PPSs for a subsequent layer in accordance with steps 124 and 126. On the other hand, if the most recent layer was the last layer ("YES" branch of 128), video decoder 30 may proceed to decode video data of the layers based on the VPS, SPSs, and PPSs (130). Examples of coding video data based at least in part on a VPS are discussed in greater detail with respect to FIGS. 9-12.

Although not shown in the example of FIG. 8, in some examples, video decoder 30 may additionally decode one or more LPSs and/or one or more GPSs, as described above. The LPSs may conform substantially to the examples of Table 9, Table 10, or Table 12, while the GPS may conform substantially to the examples of Table 14, Table 15, or Table 17. In such examples, video decoder 30 decodes the video data also based at least in part on the LPSs and/or the GPSs.

In this manner, the method of FIG. 8 represents an example of a method including coding a video parameter set (VPS) for one or more layers of video data, wherein each of the one or more layers of video data refer to the VPS, and coding the one or more layers of video data based at least in part on the VPS.

Figure 9:
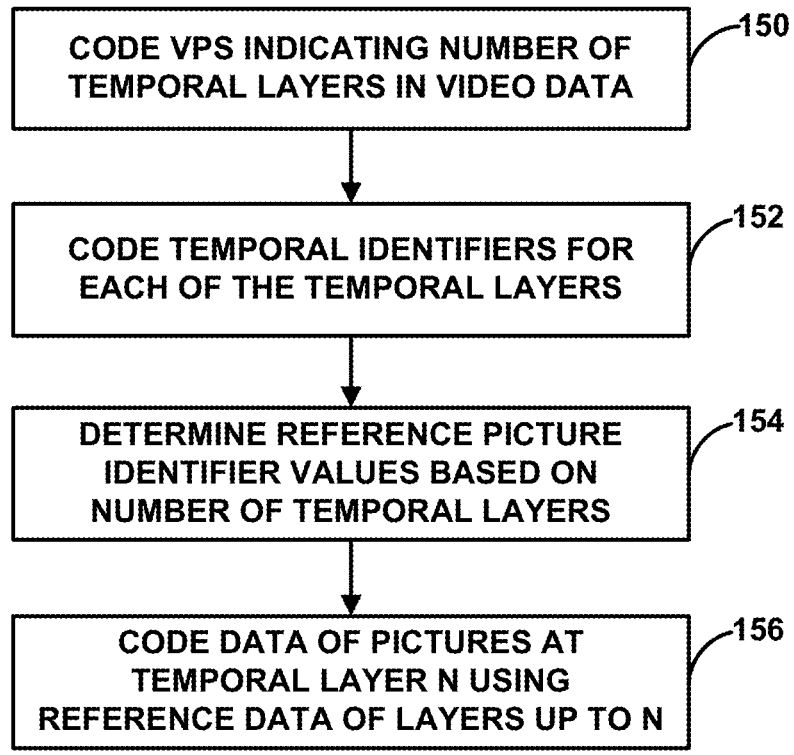
FIG. 9 is a flowchart illustrating an example method of coding video data based at least in part on a number of temporal layers as signaled in a VPS.

FIG. 9 is a flowchart illustrating an example method of coding video data based at least in part on a number of temporal layers as signaled in a VPS. The method of FIG. 9 may be performed by video encoder 20 and/or video decoder 30. For purposes of example, the method of FIG. 9 is described with respect to video decoder 30.

In this example, video decoder 30 codes (that is, decodes) a VPS indicating a number of temporal layers in video data (150), e.g., of one or more layers to which the VPS corresponds. For example, video decoder 30 may decode "cnt_t" as described with respect to Table 2 above. As another example, video decoder 30 may decode num_temporal_layers_minus1, as described with respect to Table 5 above.

Based on this indication, in this example, video decoder 30 decodes temporal identifiers for each of the temporal layers (152). Likewise, video decoder 30 may determine reference picture identifier values based on the number of temporal layers (154). For example, video decoder 30 may be configured to determine that, for a current picture at layer N, the current picture will not use pictures at or above layer N+1 for reference. Therefore, video decoder 30 may determine identifiers for potential reference pictures at layers at or below layer N. Moreover, video decoder 30 may decode data of pictures at temporal layer N using reference data of layers up to (and including) layer N (156). Thus, FIG. 9 represents an example of a method including coding data of a VPS indicative of a maximum number of temporal layers in one or more layers of video data, and coding the one or more layers based at least in part on the VPS.

Figure 10:
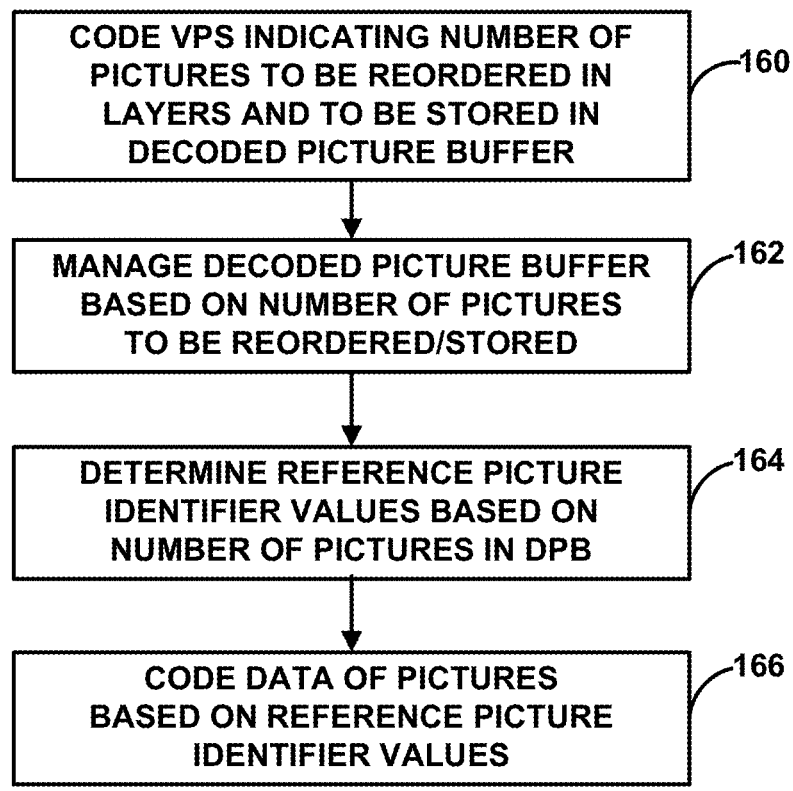
FIG. 10 is a flowchart illustrating an example method of coding video data based at least in part on a number of pictures to be reordered in one or more layers and pictures to be stored in a decoded picture buffer.

FIG. 10 is a flowchart illustrating an example method of coding video data based at least in part on a number of pictures to be reordered in one or more layers and pictures to be stored in a decoded picture buffer. The method of FIG. 10 may be performed by video encoder 20 and/or video decoder 30. For purposes of example, the method of FIG. 10 is described with respect to video decoder 30.

In this example, video decoder 30 decodes a VPS indicating a number of pictures to be reordered in one or more layers of video data and a number of pictures to be stored in a decoded picture buffer (e.g., reference picture memory 82) at a given time (160). For example, video decoder 30 may decode a syntax element of the VPS corresponding substantially to num_reorder_pics as described with respect to Table 16 above and/or bitstream restriction information that specifies a DPB size. In other examples, the VPS could include only one or the other, and not necessarily both, of the number of pictures to be reordered and the number of pictures to be stored in the decoded picture buffer. Video decoder 30 may then manage the decoded picture buffer (e.g., reference picture memory 82) based on the number of pictures to be reordered and/or stored (162). For example, video decoder 30 may remove pictures form reference picture memory 82 when more than the number of pictures to be stored are stored in reference picture memory 82.

Video decoder 30 may also determine reference picture identifier values based on the number of pictures in the DPB (that is, in reference picture memory 82) (164). Furthermore, video decoder 30 may decode data of pictures based on the reference picture identifier values (166). Thus, the method of FIG. 10 represents an example of a method including coding data of a VPS indicative of a number of pictures to be stored in a decoded picture buffer (DPB) during decoding of one or more layers and a method including coding data of a VPS indicative of a number of frames to be reordered in at least one of one or more layers.

Figure 11:
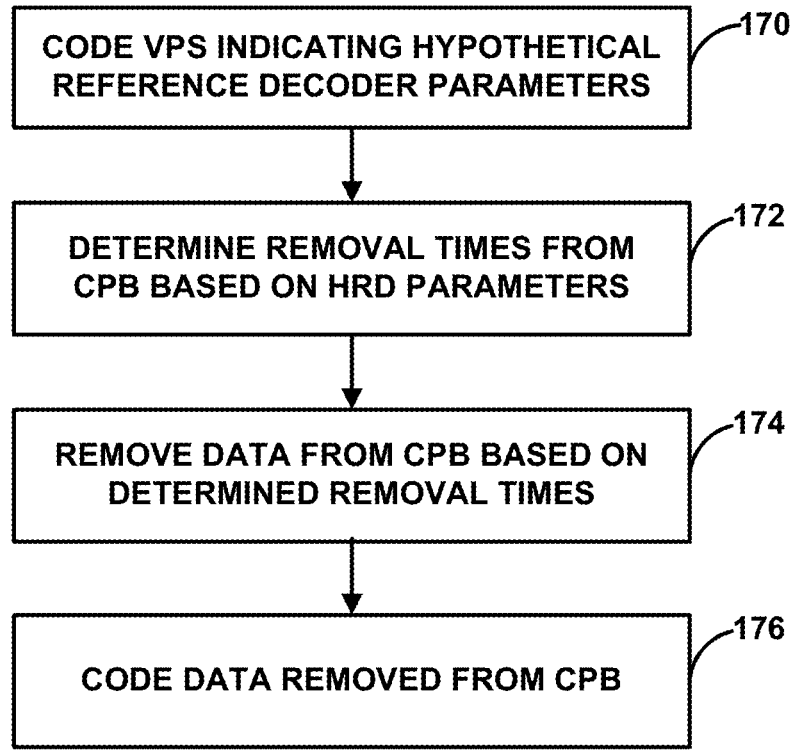
FIG. 11 is a flowchart illustrating an example method of coding video data based at least in part on hypothetical reference decoder (HRD) parameters signaled in a VPS.

FIG. 11 is a flowchart illustrating an example method of coding video data based at least in part on hypothetical reference decoder (HRD) parameters signaled in a VPS. The method of FIG. 11 may be performed by video encoder 20 and/or video decoder 30. For purposes of example, the method of FIG. 11 is described with respect to video decoder 30.

In this example, video decoder 30 decodes a VPS indicating HRD parameters (170). Video decoder 30 may further determine removal times for pictures from a coded picture buffer (CPB) based on the HRD parameters (172). Video decoder 30 may then remove data from the CPB based on the determined removal times (174), and decode the data removed from the CPB. Accordingly, the method of FIG. 11 represents an example of a method including coding data of a VPS indicative of one or more hypothetical reference decoder (HRD) parameters, and coding data of one or more layers based on the HDR parameters.

Figure 12:
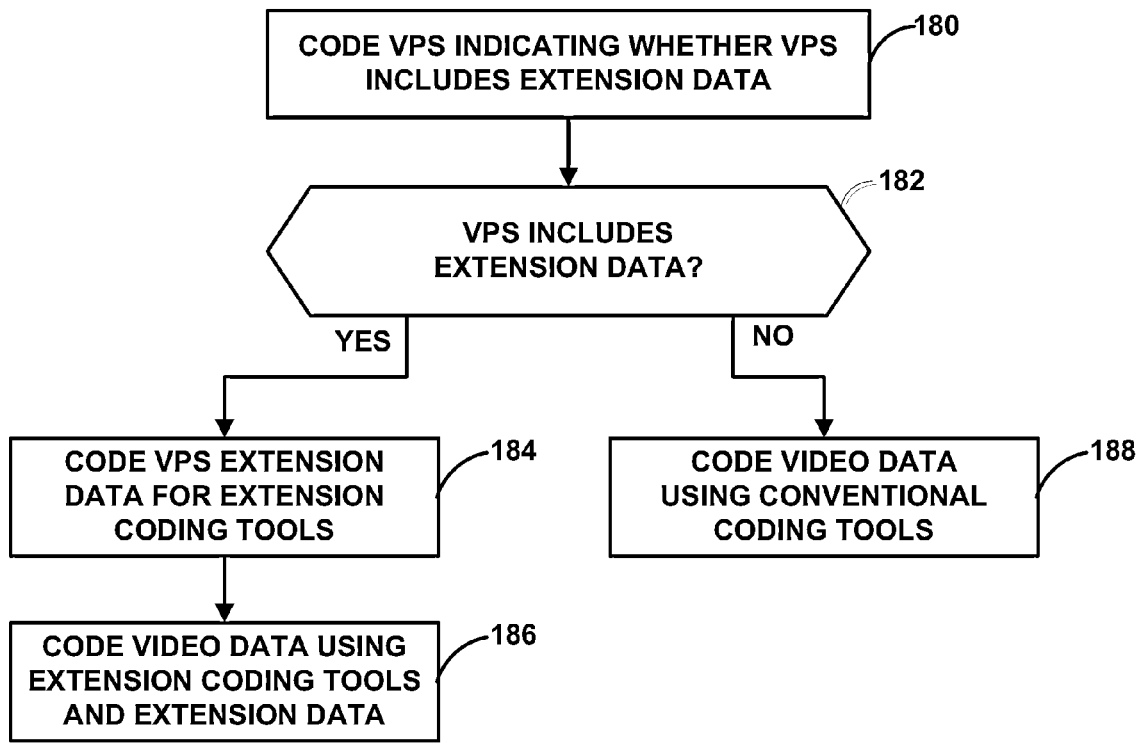
FIG. 12 is a flowchart illustrating an example method of coding video data based at least in part on extension data signaled in a VPS.

FIG. 12 is a flowchart illustrating an example method of coding video data based at least in part on extension data signaled in a VPS. The method of FIG. 12 may be performed by video encoder 20 and/or video decoder 30. For purposes of example, the method of FIG. 12 is described with respect to video decoder 30.

Video decoder 30, in this example, decodes data of a VPS indicating whether the VPS includes extension data (180). For example, video decoder 30 may decode a vps_extension_flag of the VPS. Video decoder 30 then determines whether the data indicates that the VPS includes extension data (182). If the data indicates that the VPS includes extension data ("YES" branch of 182), video decoder 30 codes VPS extension data for one or more extension coding tools (184), and decodes video data using the extension coding tools and extension data (186). On the other hand, if the data indicates that the VPS does not include extension data ("NO" branch of 182), video decoder 30 may decode the video data using conventional coding tools (188). In this manner, the method of FIG. 12 represents an example of a method including coding data of a VPS indicative of whether the VPS includes an extension beyond a corresponding standard, and when the VPS includes the extension, data for the extension, as well as coding video data based on the extension data of the VPS.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

In still other examples, this disclosure contemplates a computer readable medium comprising a data structure stored thereon, wherein the data structure includes an encoded bitstream consistent with this disclosure. In particular, the encoded bitstream may include one or more layers of video data, and a video parameter (VPS) for the one or more layers of video data, wherein each of the one or more layers of video data refer to the VPS and the one or more layers of video data are coded based at least in part on the VPS.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   coding a video parameter set (VPS) for a bitstream comprising a plurality of layers of video data, wherein each of the plurality of layers of video data refer to the VPS, and wherein coding the VPS comprises:
      coding data of the VPS indicative of a number of frames to be reordered in at least one of the plurality of layers of video data,
      coding data of the VPS indicative of a number of pictures to be stored in a decoded picture buffer (DPB) during decoding of the plurality of layers of video data,
      coding data of the VPS indicative of a maximum number of temporal layers in the bitstream including the plurality of layers of video data;
      coding data of the VPS indicative of a maximum number of views in the bitstream including the plurality of layers of video data;
      coding information defining a mapping of a sample index to a characteristics indicator, wherein coding the information defining the mapping comprises coding one or more of: a respective spatial resolution for each of a plurality of dependency indexes, a frame rate for each of a plurality of temporal indexes, or a view identifier for each of a plurality of view indexes; and
      coding the plurality of layers of video data based at least in part on the VPS.

2. The method of claim 1, wherein coding the VPS further comprises coding data of the VPS indicative of one or more sets of hypothetical reference decoder (HRD) parameters.

3. The method of claim 1, wherein coding the VPS further comprises coding data of the VPS indicative of whether the VPS includes an extension beyond a corresponding standard, and when the VPS includes the extension, data for the extension.

4. The method of claim 1, wherein coding the plurality of layers of video data comprises coding the plurality of layers of video data in accordance with High Efficiency Video Coding (HEVC).

5. The method of claim 1, wherein coding the plurality of layers of video data comprises coding the plurality of layers of video data in accordance with at least one of Multiview Video Coding (MVC) or Scalable Video Coding (SVC).

6. The method of claim 1, wherein coding the VPS comprises coding information specifying, for one or more dimensions of the plurality of layers of video data, one or more of:
   a number of priority layers in the plurality of layers of video data,
   a number of dependency layers in the plurality of layers of video data,
   a number of temporal layers in the plurality of layers of video data, or
   a maximum number of quality layers for any of the dependency layers in the plurality of layers of video data.

7. The method of claim 6, wherein when a subset of the plurality of layers of video data have the same spatial resolution and the same bit depth, each of the layers of the subset corresponds to a different one of the dependency layers.

8. The method of claim 7, wherein coding the information defining the mapping comprises coding information that specifies a respective characteristics indicator for each of a plurality of characteristics indexes when a characteristics indicator defining characteristics of a dimension of the plurality of layers of video data is not within an index range from zero to a sample dimension counter minus 1 wherein the counter is defined by an index.

9. The method of claim 7, wherein coding the information defining the mapping comprises coding one or more of:
   a pair of specific depth values for luminance and chrominance for each of a plurality of bit depth indexes, or
   a specific chrominance sampling format indicator for each of a plurality of chrominance sampling formats.

10. The method of claim 1, wherein coding the VPS comprises coding information defining control parameters and one or more tool enabling/disabling flags.

11. The method of claim 10, wherein the control parameters and the one or more tool enabling/disabling flags comprise one or more of:
    a pcm_bit_depth_luma_minus1,
    a pcm_bit_depth_chroma_minus1,
    a loop_filter_across_slice_flag,
    a pcm_loop_filter_disable_flag,
    a temporal_id_nesting_flag,
    one or more tile related syntax elements,
    a chroma_pred_from_luma_enabled_flag,
    a sample_adaptive_offset_enabled_flag,
    an adaptive_loop_filter_enabled_flag, or
    an inter_4×4_enabled_flag.

12. The method of claim 1, wherein coding the VPS comprises coding information defining one or more operation point descriptors.

13. The method of claim 12, wherein coding the information defining the one or more operation point descriptors comprises coding information defining one or more of:
    a number of maximum operation points,
    dependency between different layers or views,
    profile and level for each of the operation points, or
    bit rate for each of the operation points.

14. The method of claim 1, further comprising coding a respective layered sequence parameter set (LPS) for each of the plurality of layers of video data, wherein coding the plurality of layers of video data based at least in part on the VPS comprises coding the plurality of layers of video data based at least in part on the VPS and the respective LPS.

15. The method of claim 14, wherein coding the respective LPSs for each of the plurality of layers of video data comprises coding information defining a sample dimension indication that indicates, for each dimension, an index to each dimension.

16. The method of claim 14, wherein coding the respective LPSs for each of the plurality of layers of video data comprises coding information defining control parameters and tool enabling/disabling flags.

17. The method of claim 16, wherein the control parameters and the one or more tool enabling/disabling flags comprise one or more of:
- a pcm_bit_depth_luma_minus1,
- a pcm_bit_depth_chroma_minus1,
- a loop_filter_across_slice_flag,
- a pcm_loop_filter_disable_flag,
- one or more tile related syntax elements,
- a chroma_pred_from_luma_enabled_flag,
- a sample_adaptive_offset_enabled_flag,
- an adaptive_loop_filter_enabled_flag, or
- a coding unit (CU) hierarchy.

18. The method of claim 14, wherein coding the respective LPSs for each of the plurality of layers of video data comprises coding information defining information of one or more other parameter sets applying to at least one of a slice, a group of slices, a picture, or several pictures referring to a common picture parameter set (PPS).

19. The method of claim 1, further comprising coding one or more picture parameter sets (PPSs) such that the PPSs do not refer to the VPS, do not refer to layered sequence parameter sets (LPSs) of the plurality of layers of video data.

20. The method of claim 19, wherein coding the plurality of layers of video data based at least in part on the VPS comprises coding the plurality of layers of video data based at least in part on the VPS, the PPSs, and the LPSs, such that when a syntax element of one of the PPSs conflicts with the VPS or a respective one of the LPSs, coding a corresponding one of the plurality of layers of video data based on the syntax element of the one of the PPSs.

21. The method of claim 1, further comprising coding a grouping parameter set (GPS) that groups all parameter sets, including the VPS, for the plurality of layers of video data together.

22. The method of claim 21, wherein coding the GPS comprises coding information defining an identifier of the GPS, the method further comprising coding information of a slice header corresponding to the identifier of the GPS.

23. The method of claim 1, wherein coding the plurality of layers of video data comprises decoding the plurality of layers of video data, and wherein coding the VPS comprises parsing the VPS.

24. The method of claim 1, wherein coding the plurality of layers of video data comprises encoding the plurality of layers of video data, and wherein coding the VPS comprises constructing the VPS.

25. A device for coding video data, the device comprising a video coder configured to:
- code a video parameter set (VPS) for a bitstream comprising a plurality of layers of video data, wherein each of the plurality of layers of video data refer to the VPS, and wherein the video coder configured to code the VPS is configured to:
  - code data of the VPS indicative of a number of frames to be reordered in at least one of the plurality of layers of video data,
  - code data of the VPS indicative of a number of pictures to be stored in a decoded picture buffer (DPB) during decoding of the plurality of layers of video data,
  - code data of the VPS indicative of a maximum number of temporal layers in the bitstream including the plurality of layers of video data;
  - code data of the VPS indicative of a maximum number of views in the bitstream including the plurality of layers of video data;
  - code information defining a mapping of a sample index to a characteristics indicator, wherein to code the information defining the mapping, the video coder is configured to code one or more of: a respective spatial resolution for each of a plurality of dependency indexes, a frame rate for each of a plurality of temporal indexes, or a view identifier for each of a plurality of view indexes; and
- code the plurality of layers of video data based at least in part on the VPS.

26. The device of claim 25, wherein the video coder configured to code the VPS is further configured to code data of the VPS indicative of one or more sets of hypothetical reference decoder (HRD) parameters.

27. The device of claim 25, wherein the video coder configured to code the VPS is further configured to code data of the VPS indicative of whether the VPS includes an extension beyond a corresponding standard, and when the VPS includes the extension, data for the extension.

28. The device of claim 25, wherein the video coder is configured to code the plurality of layers of video data in accordance with one of High Efficiency Video Coding (HEVC), Multiview Video Coding (MVC), and Scalable Video Coding (SVC).

29. The device of claim 25, wherein the video coder comprises a video decoder, and wherein the device further comprises a display configured to display the video data.

30. The device of claim 25, wherein the video coder comprises a video encoder, and wherein the device further comprises a camera configured to generate the video data.

31. The device of claim 25, wherein the device comprises at least one of:
- an integrated circuit;
- a microprocessor; or
- a mobile wireless communication device that includes the video coder.

32. The device of claim 25, wherein the video coder configured to code the VPS is configured to code information defining one or more operation point descriptors.

33. The method of claim 32, wherein to code the information defining the one or more operation point descriptors, the video coder is configured to code information defining one or more of:
- a number of maximum operation points,
- dependency between different layers or views,
- profile and level for each of the operation points, or
- bit rate for each of the operation points.

34. A device for coding video data, the device comprising:
means for coding a video parameter set (VPS) for a bitstream comprising a plurality of layers of video data, wherein each of the plurality of layers of video data refer to the VPS, and wherein the means for coding the VPS comprises:
- means for coding data of the VPS indicative of a number of frames to be reordered in at least one of the plurality of layers of video data,
- means for coding data of the VPS indicative of a number of pictures to be stored in a decoded picture buffer (DPB) during decoding of the plurality of layers of video data,
- means for coding data of the VPS indicative of a maximum number of temporal layers in the bitstream including the plurality of layers of video data;
- means for coding data of the VPS indicative of a maximum number of views in the bitstream including the plurality of layers of video data;
- means for coding information defining a mapping of a sample index to a characteristics indicator, wherein the means for coding the information defining the mapping comprises means for coding one or more of: a respective spatial resolution for each of a plurality of dependency indexes, a frame rate for each of a plurality of temporal indexes, or a view identifier for each of a plurality of view indexes; and
means for coding the plurality of layers of video data based at least in part on the VPS.

35. The device of claim 34, wherein the means for coding the VPS further comprises means for coding data of the VPS indicative of one or more sets of hypothetical reference decoder (HRD) parameters.

36. The device of claim 34, wherein the means for coding the VPS further comprises means for coding data of the VPS indicative of whether the VPS includes an extension beyond a corresponding standard, and when the VPS includes the extension, data for the extension.

37. The device of claim 34, wherein the means for coding the VPS comprises means for coding the plurality of layers of video data in accordance with one of High Efficiency Video Coding (HEVC), Multiview Video Coding (MVC), and Scalable Video Coding (SVC).

38. The device of claim 34, wherein the means for coding the VPS comprises means for coding information defining one or more operation point descriptors.

39. The device of claim 38, wherein the means for coding the information defining the one or more operation point descriptors comprises means for coding information defining one or more of:
a number of maximum operation points,
dependency between different layers or views,
profile and level for each of the operation points, or
bit rate for each of the operation points.

40. A non-transitory computer-readable storage medium having stored thereon instructions that, when executed, cause a processor to:
code a video parameter set (VPS) for a bitstream comprising a plurality of layers of video data, wherein each of the plurality of layers of video data refer to the VPS, and wherein the instructions that cause the processor to code the VPS comprise instructions that cause the processor to:
code data of the VPS indicative of a number of frames to be reordered in at least one of the plurality of layers of video data,
code data of the VPS indicative of a number of pictures to be stored in a decoded picture buffer (DPB) during decoding of the plurality of layers of video data,
code data of the VPS indicative of a maximum number of temporal layers in the bitstream including the plurality of layers of video data;
code data of the VPS indicative of a maximum number of views in the bitstream including the plurality of layers of video data;
code information defining a mapping of a sample index to a characteristics indicator, wherein the instructions that cause the processor to code information defining the mapping further comprise instructions that, when executed, cause the processor to code one or more of: a respective spatial resolution for each of a plurality of dependency indexes, a frame rate for each of a plurality of temporal indexes, or a view identifier for each of a plurality of view indexes; and
code the plurality of layers of video data based at least in part on the VPS.

41. The non-transitory computer-readable storage medium of claim 40, wherein the instructions that cause the processor to code the VPS further comprise instructions that, when executed, cause the processor to code data of the VPS indicative of one or more sets of hypothetical reference decoder (HRD) parameters.

42. The non-transitory computer-readable storage medium of claim 40, wherein the instructions that cause the processor to code the VPS further comprise instructions that, when executed, cause the processor to code data of the VPS indicative of whether the VPS includes an extension beyond a corresponding standard, and when the VPS includes the extension, data for the extension.

43. The non-transitory computer-readable storage medium of claim 40, wherein the instructions that cause the processor to code the plurality of layers of video data comprise instructions that, when executed, cause the processor to code the plurality of layers of video data in accordance with one of High Efficiency Video Coding (HEVC), Multiview Video Coding (MVC), and Scalable Video Coding (SVC).

44. The non-transitory computer-readable storage medium of claim 40, wherein the instructions that cause the processor to code the VPS further comprise instructions that, when executed, cause the processor to code information defining one or more operation point descriptors.

45. The non-transitory computer-readable storage medium of claim 44, wherein the instructions that cause the processor to code the information defining the one or more operation point descriptors further comprise instructions that, when executed, cause the processor to code information defining one or more of:
a number of maximum operation points,
dependency between different layers or views,
profile and level for each of the operation points, or
bit rate for each of the operation points.

* * * * *